US012604219B2

(12) United States Patent
Gutman et al.

(10) Patent No.: US 12,604,219 B2
(45) Date of Patent: Apr. 14, 2026

(54) MEASURING BACKHAUL CHANNEL OF RIS/REPEATER

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 17/810,563

(22) Filed: Jul. 1, 2022

(65) Prior Publication Data

US 2024/0007881 A1     Jan. 4, 2024

(51) Int. Cl.
   H04W 24/08       (2009.01)
   H04B 7/15        (2006.01)
   H04L 5/00        (2006.01)
(52) U.S. Cl.
   CPC .............. H04W 24/08 (2013.01); H04B 7/15 (2013.01); H04L 5/0048 (2013.01)
(58) Field of Classification Search
   CPC ..... H04W 24/08; H04B 7/15; H04B 7/15528; H04L 5/0048
   See application file for complete search history.

(56) References Cited

U.S. PATENT DOCUMENTS

| | | | | |
|---|---|---|---|---|
| 2021/0127389 A1* | 4/2021 | Liu | ........................ | H04L 5/0087 |
| 2022/0053486 A1* | 2/2022 | Abedini | ............. | H04B 7/15542 |
| 2022/0174509 A1* | 6/2022 | Noh | .................... | H04B 7/15528 |
| 2023/0327735 A1* | 10/2023 | Awadin | .............. | H04B 7/06952 |
| 2024/0057190 A1* | 2/2024 | MolavianJazi | ....... | H04W 76/19 |
| 2024/0348310 A1* | 10/2024 | Nilsson | ................ | H04B 7/0697 |
| 2024/0388326 A1* | 11/2024 | Haghighat | ............ | H04L 5/0048 |

OTHER PUBLICATIONS

International Search Report and Written Opinion—PCT/US2023/024195—ISA/EPO—Sep. 27, 2023.

* cited by examiner

*Primary Examiner* — Luat Phung
(74) *Attorney, Agent, or Firm* — Procopio, Cory, Hargreaves & Savitch LLP

(57) ABSTRACT

A network node may transmit a signal for a controller associated with at least one RIS/repeater, the signal including a TCI state associated with at least one backhaul channel between the network node and at least one repeater, and obtain a measurement of a reference signal of the at least one backhaul channel based on the signal including the TCI state associated with the at least one backhaul channel. The controller and the at least one RIS/repeater may indicate the measurement of reference signal of the at least one backhaul channel based on the signal including the TCI state associated with the at least one backhaul channel.

30 Claims, 19 Drawing Sheets

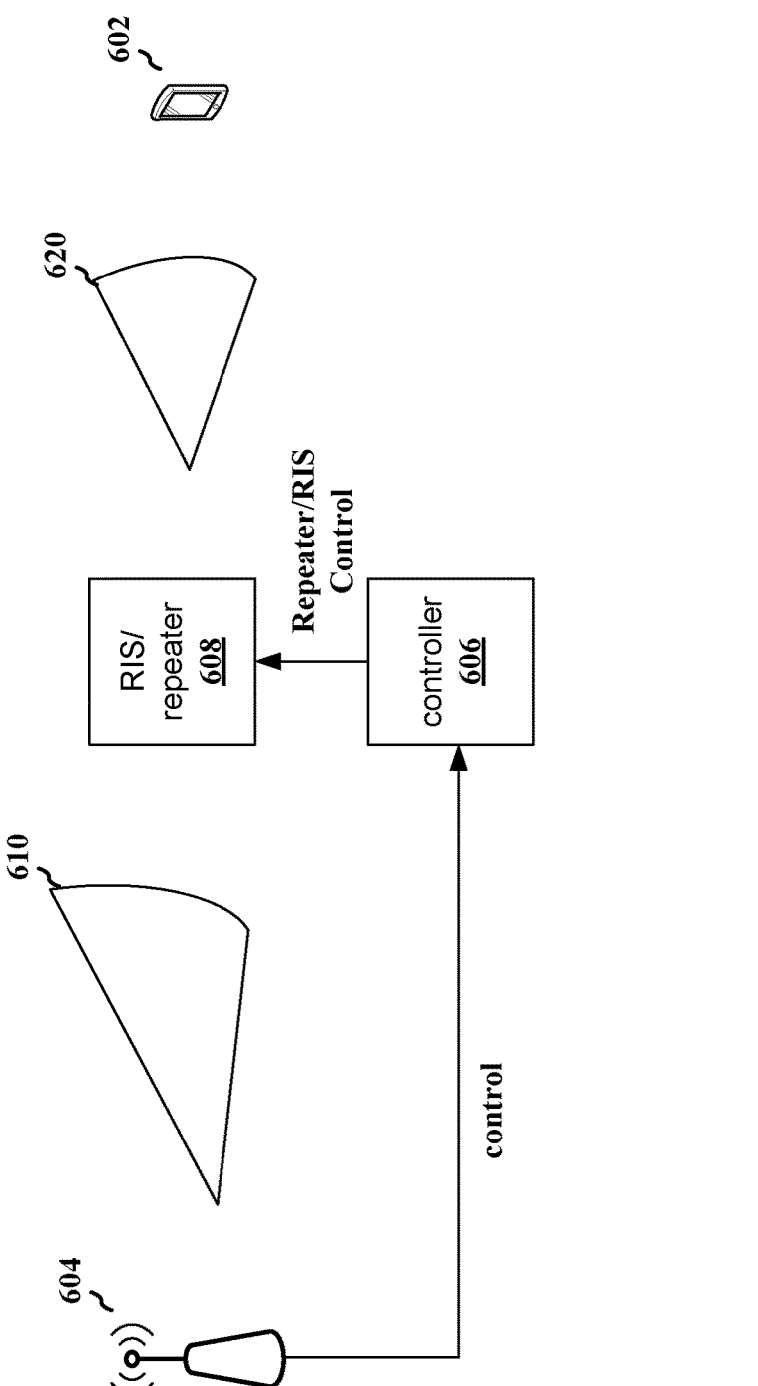
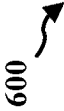
FIG. 6

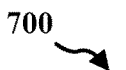
700
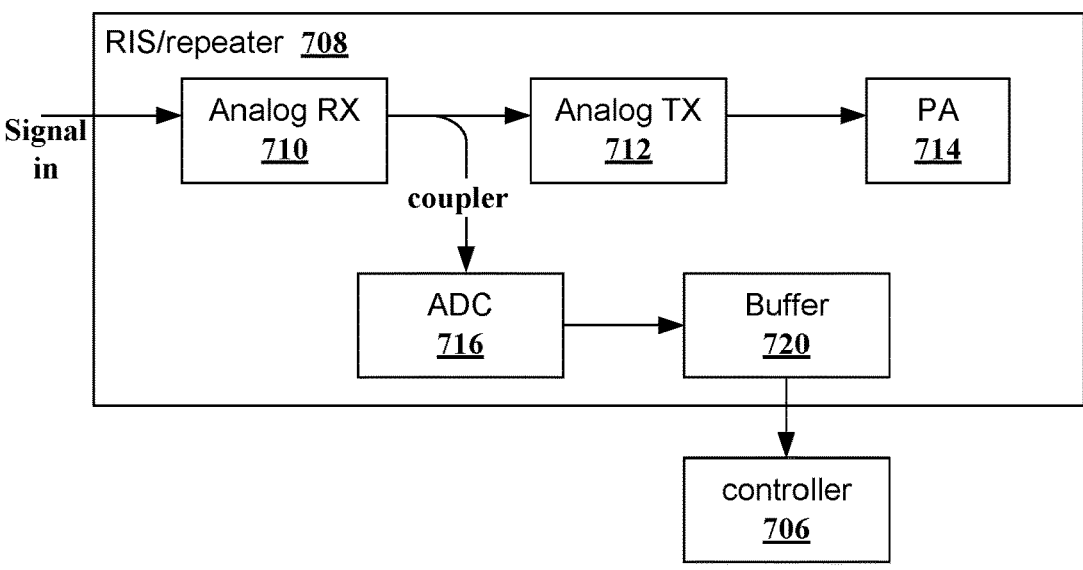
FIG. 7A
750
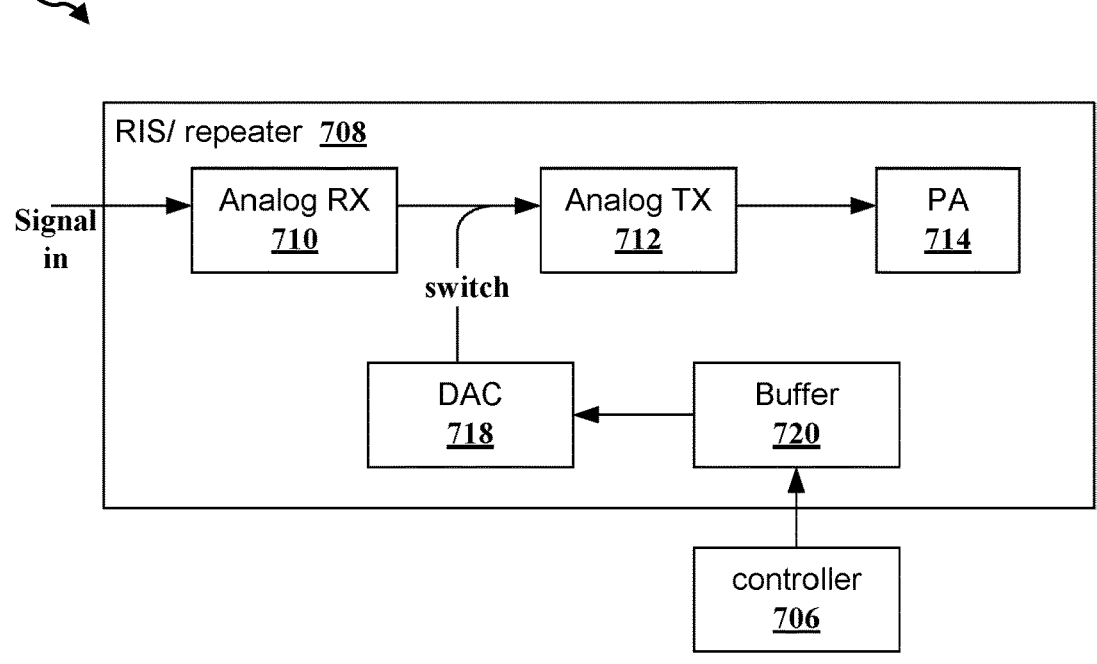
FIG. 7B

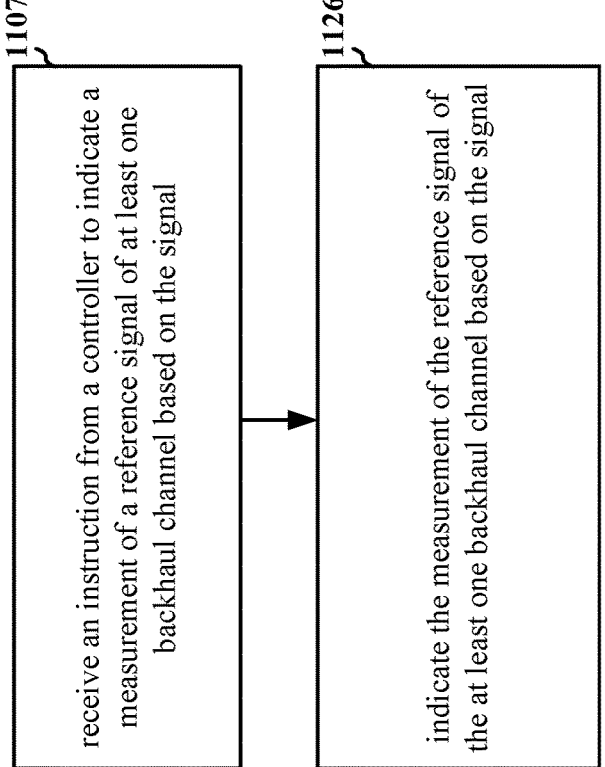
receive an instruction from a controller to indicate a measurement of a reference signal of at least one backhaul channel based on the signal
1107
indicate the measurement of the reference signal of the at least one backhaul channel based on the signal
1126
1100
FIG. 11

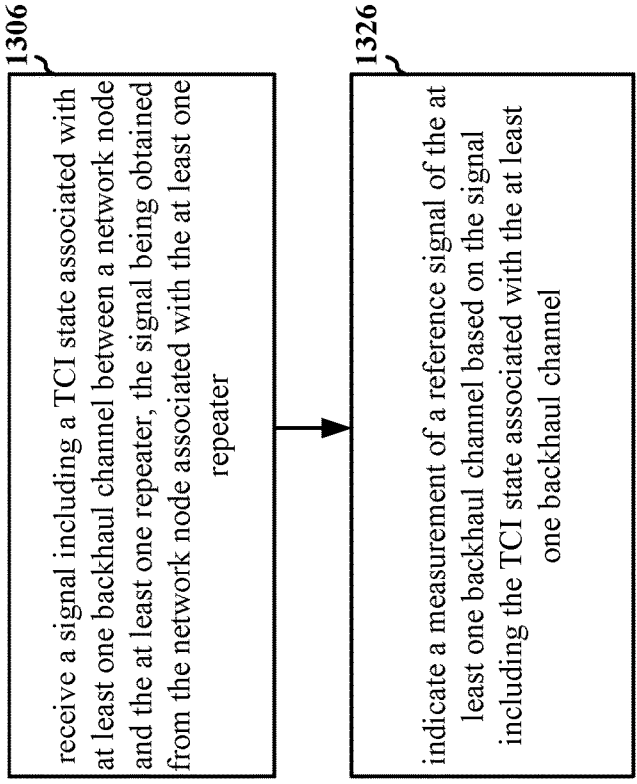

1306 receive a signal including a TCI state associated with at least one backhaul channel between a network node and the at least one repeater, the signal being obtained from the network node associated with the at least one repeater

1326 indicate a measurement of a reference signal of the at least one backhaul channel based on the signal including the TCI state associated with the at least one backhaul channel

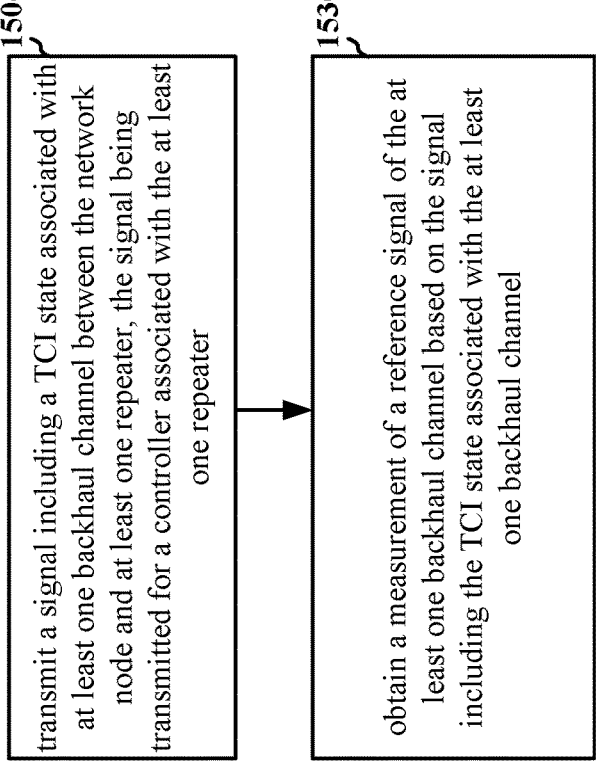

1506 transmit a signal including a TCI state associated with at least one backhaul channel between the network node and at least one repeater, the signal being transmitted for a controller associated with the at least one repeater

1530 obtain a measurement of a reference signal of the at least one backhaul channel based on the signal including the TCI state associated with the at least one backhaul channel

MEASURING BACKHAUL CHANNEL OF RIS/REPEATER

TECHNICAL FIELD

The present disclosure relates generally to communication systems, and more particularly, to a method of wireless communication including measuring a backhaul (BH) channel of a reconfigurable intelligent surfaces (RIS) or a repeater.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a network node configured to transmit a signal including a TCI state associated with at least one backhaul channel between the network node and at least one repeater, the signal being transmitted for a controller associated with the at least one repeater, and obtain a measurement of a reference signal of the at least one backhaul channel based on the signal including the TCI state associated with the at least one backhaul channel.

In an aspect of the disclosure, a method, a computer-readable medium, and an apparatus are provided. The apparatus may include a controller of a RIS/repeater configured to receive a signal including a TCI state associated with at least one backhaul channel between a network node and the at least one repeater, the signal being obtained from the network node associated with the at least one repeater, and indicate a measurement of a reference signal of the at least one backhaul channel based on the signal including the TCI state associated with the at least one backhaul channel.

In an aspect of the disclosure, a method, a computer-readable medium, and an apparatus are provided. The apparatus may include a RIS/repeater configured to receive an indication from a controller to indicate a measurement of a reference signal of at least one backhaul channel based on the signal, and indicate the measurement of the reference signal of the at least one backhaul channel based on the signal.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 illustrates a wireless communication including a RIS/repeater and a controller.

FIG. 7A is a diagram of the RIS/repeater configured to measure the DL channel of the BH channel.

FIG. 7B is a diagram of the RIS/repeater configured to measure the UL channel of the BH channel.

FIG. 11 is a flowchart of a method of wireless communication.

FIG. 13 is a flowchart of a method of wireless communication.

FIG. 15 is a flowchart of a method of wireless communication.

DETAILED DESCRIPTION

Figure 1:
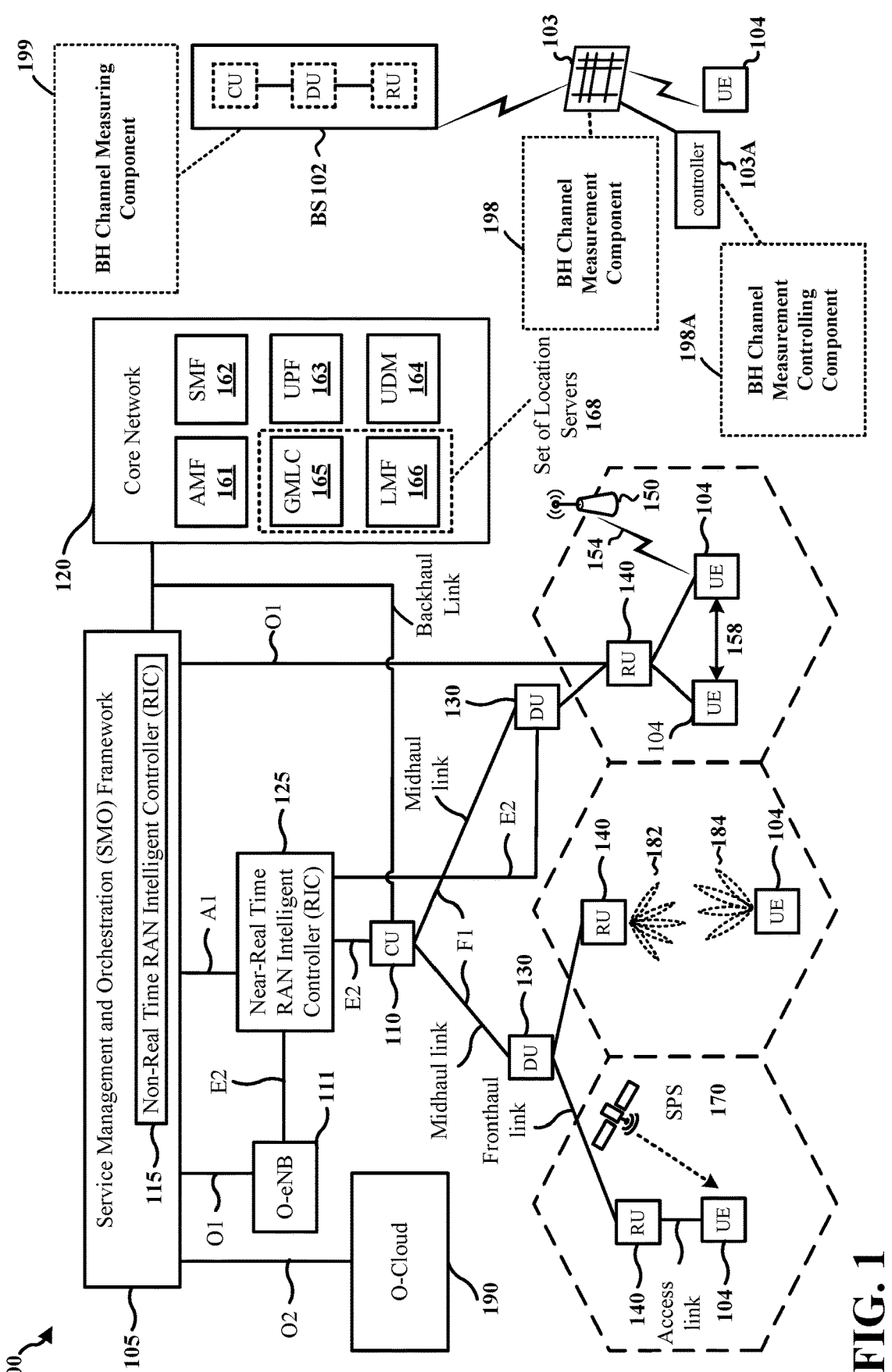
FIG. 1 is a diagram illustrating an example of a wireless communications system and an access network.

In some aspects, a network node may configure a controller and/or a reconfigurable intelligent surfaces (RIS) and/or a repeater to measure one or more backhaul (BH) channels between the network node and the RIS/repeater or between multiple RIS/repeaters for multi-hop implementation. The network node may modify or optimize the configuration of the RIS/repeater based on the measurement of the one or more BH channels.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). In some aspects, the example of wireless communication may include a RIS/repeater 103. The RIS/repeater 103 may reflect or amplify and forward (A&F) the signal between the base station 102 and the UE 104.

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the RIS/repeater 103 may include a BH channel measurement component 198 configured to receive an indication from a controller to indicate a measurement of a reference signal of at least one BH channel based on the signal, and indicate the measurement of the reference signal of the at least one BH channel based on the signal. In certain aspects, the controller 103A may include a BH channel measurement controlling component 198A configured to receive a signal including a TCI state associated with at least one BH channel between a network node and the at least one repeater, the signal being obtained from the network node associated with the at least one repeater, and indicate a measurement of a reference signal of the at least one BH channel based on the signal including the TCI state associated with the at least one BH channel. In certain aspects, the base station 102 may include a BH channel measuring component 199 configured to transmit a signal including a TCI state associated with at least one BH channel between the network node and at least one repeater, the signal being transmitted for a controller associated with the at least one repeater, and obtain a measurement of a reference signal of the at least one BH channel based on the signal including the TCI state associated with the at least one BH channel. Although the following description may be focused on 5G NR, the concepts described herein may be applicable to other similar areas, such as LTE, LTE-A, CDMA, GSM, and other wireless technologies.

Figures 2A, 2B, 2C, 2D:
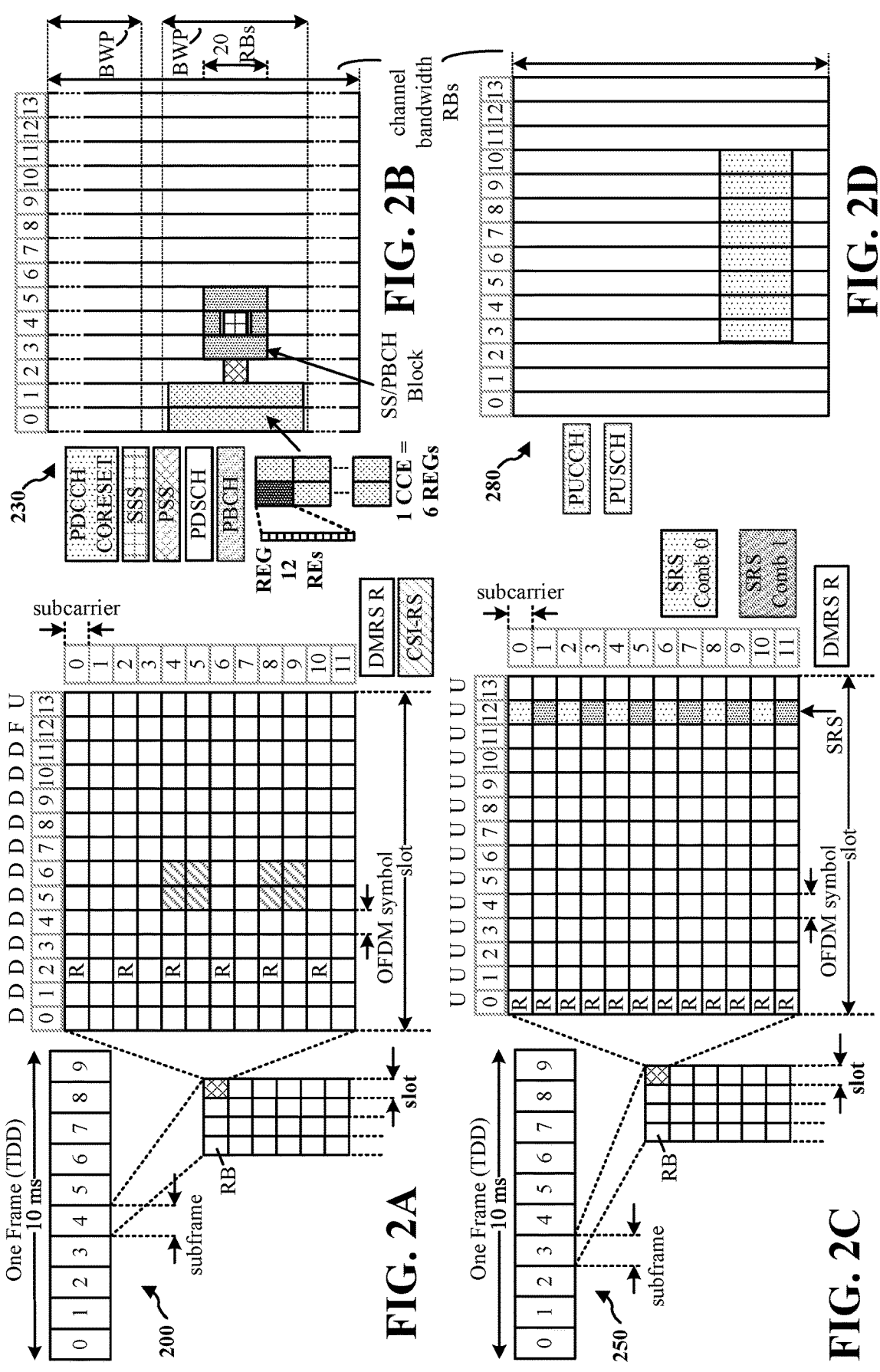
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2$^{\mu}$ slots/subframe. The subcarrier spacing may be equal to 2$^{\mu}$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
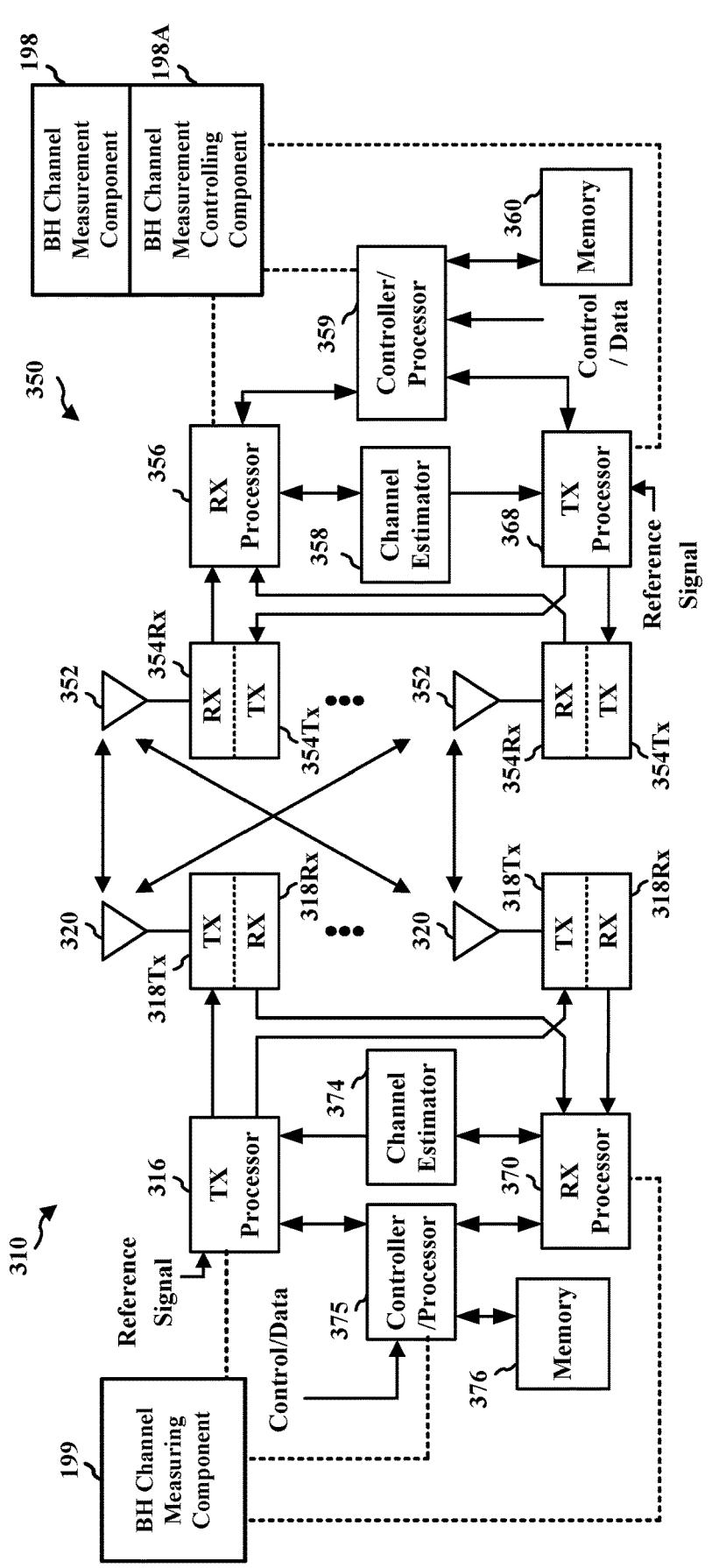
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the BH channel measurement component 198 of FIG. 1. At least one of the TX processor 368, the RX processor 356, and the controller/processor 359 may be configured to perform aspects in connection with the BH channel measurement controlling component 198A of FIG. 1. At least one of the TX processor 316, the RX processor 370, and the controller/processor 375 may be configured to perform aspects in connection with the BH channel measuring component 199 of FIG. 1.

5G wireless standards have created new opportunities for innovation and unprecedented use cases, such as eMBB, URLLC, or eMTC. Among the main drivers behind 5G is the availability of large amounts of spectrum, especially at high bands known as millimeter-wave (mmW) bands. Some of the main challenges of wireless communications at mmW bands may include increased propagation losses, even in line-of-sight (LOS) communications, due to the short wavelength and absorption by various environmental effects, and may also include high diffraction losses that make non-line-of-sight (NLOS) communications difficult.

The success of 5G technologies may be closely related to seamless communications at mmW bands. The massive MIMO technique may be utilized to create high antenna gains (albeit with reduced beamwidths) to compensate for propagation losses. Network densification may refer to the inclusion of more closely spaced base stations. Network densification may involve various layers of components, which may include base stations, remote radio heads (RRHs), various types of repeaters, small cells, femto-cells, and reflecting surfaces such as fixed reflecting surfaces, reconfigurable intelligent surfaces (RISs), or meta-surfaces, etc. Here, the repeaters or the RISs may be provided to compensate for the propagation losses from the NLOS communications. In one example, the repeaters may include an A&F repeater. The repeaters or the RISs may be associated with a controller.

A reconfiguration intelligent surface (RIS) may be employed to extend coverage, e.g., beamformed coverage, with reduced power consumption. The RIS may include a larger number of uniformly distributed electrically controllable elements. Each RIS element may have a reconfigurable electromagnetic characteristic, e.g., a reflection coefficient. Depending on the combination of configured states of the elements, the RIS may reflect and modify the incident radio waveform in a controlled manner, such as changing a reflected direction, changing a beam width, etc. The RIS may function as a near passive device, and the reflection direction may be controlled by the base station. The RIS may reflect an impinging wave in a direction indicated by the base station to a UE.

Figure 4:
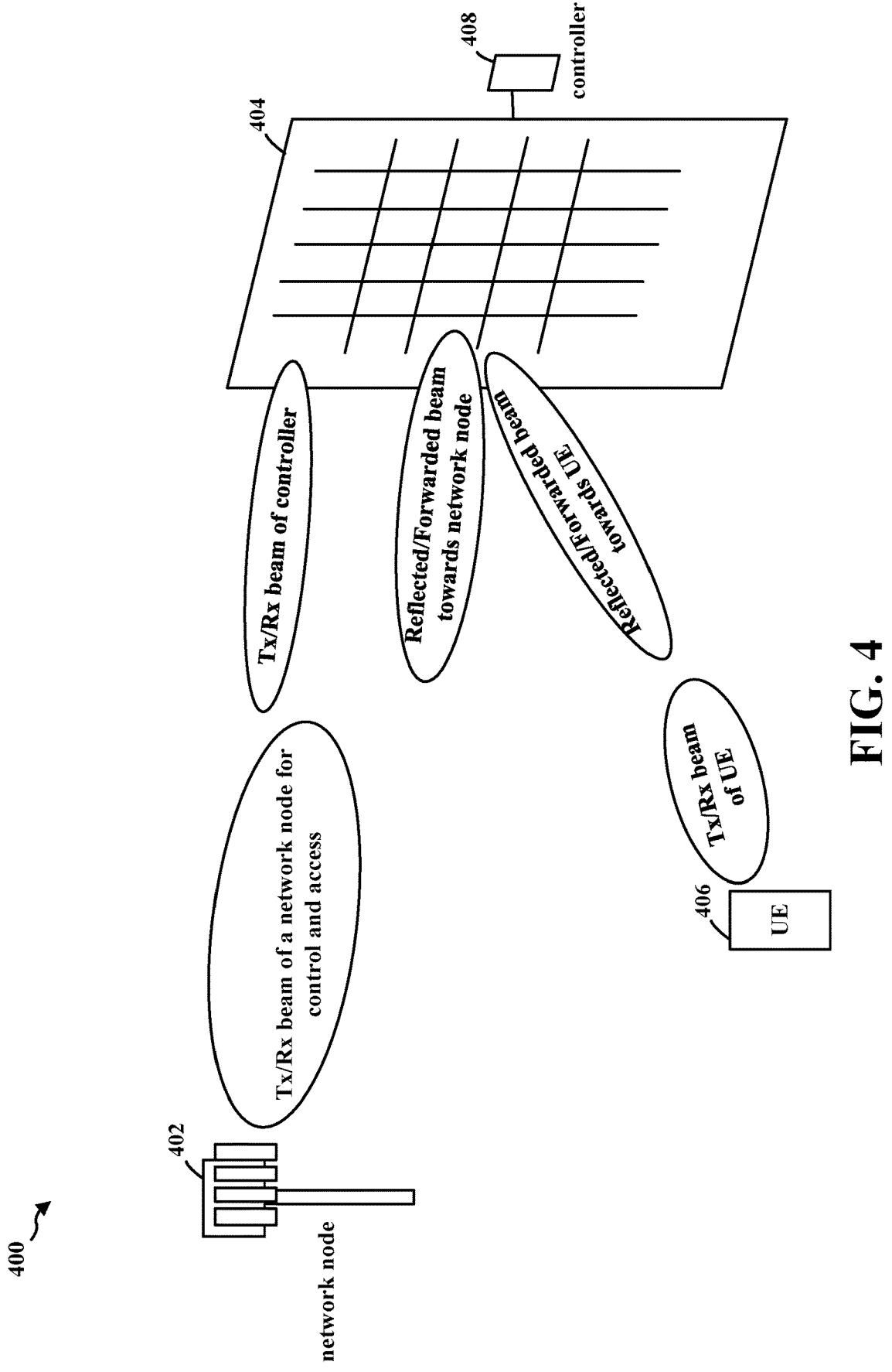
FIG. 4 is a diagram illustrating an environment in which aspects may be practiced.

FIG. 4 is a diagram illustrating an environment 400 in which aspects may be practiced. A RIS/repeater 404 may be controlled by the controller 408, which may be configured based on a configuration message received from the network node 402. The RIS/repeater 404 may be a RIS. The RIS may include a surface with densely packed small surface elements. Each surface element may have a controllable reflection coefficient. By adjusting the reflection coefficient, the phase shift between the incident and reflected rays to and from the surface element, respectively, may be controlled. Depending on the implementation, various forms of non-ideal effects may take place. For example, the phase shift may have a limited range, or there may be a gain variation that depends on the phase shift. Depending on the implementation, the surface elements may also be referred to as meta-atoms.

When the surface phase (that is, the phases of the surface elements) is properly set, the beam from the network node 402 may be reflected by the RIS toward the UE 406 in downlink. Conversely, the beam from the UE 406 may be reflected by the RIS toward the network node 402 in uplink. Accordingly, the RIS may help to reduce the pathloss and avoid blockages in the LOS propagation. The network node 402 may be any of a base station, an RRH, a repeater, etc. Although herein aspects may be described in relation to 5G and mmW bands, the aspects may be equally applicable to other technologies such as 4G LTE, IEEE 802.11 WIFI, or future generations of technologies including beyond 5G, 6G, etc., and to other bands such as the sub-6 GHz bands, terahertz bands, etc.

An RIS (e.g., the RIS/REPEATER 404) may implement a focusing operation to beamform toward a UE (e.g., the UE 406), where the phases of received rays may align. Unlike conventional beamforming, focusing may take into account the radial distance of the UE from the RIS, in to the azimuth and the elevation of the UE. Focusing may be achieved by setting the surface phase of the RIS in a particular way.

Figures 5A, 5B:
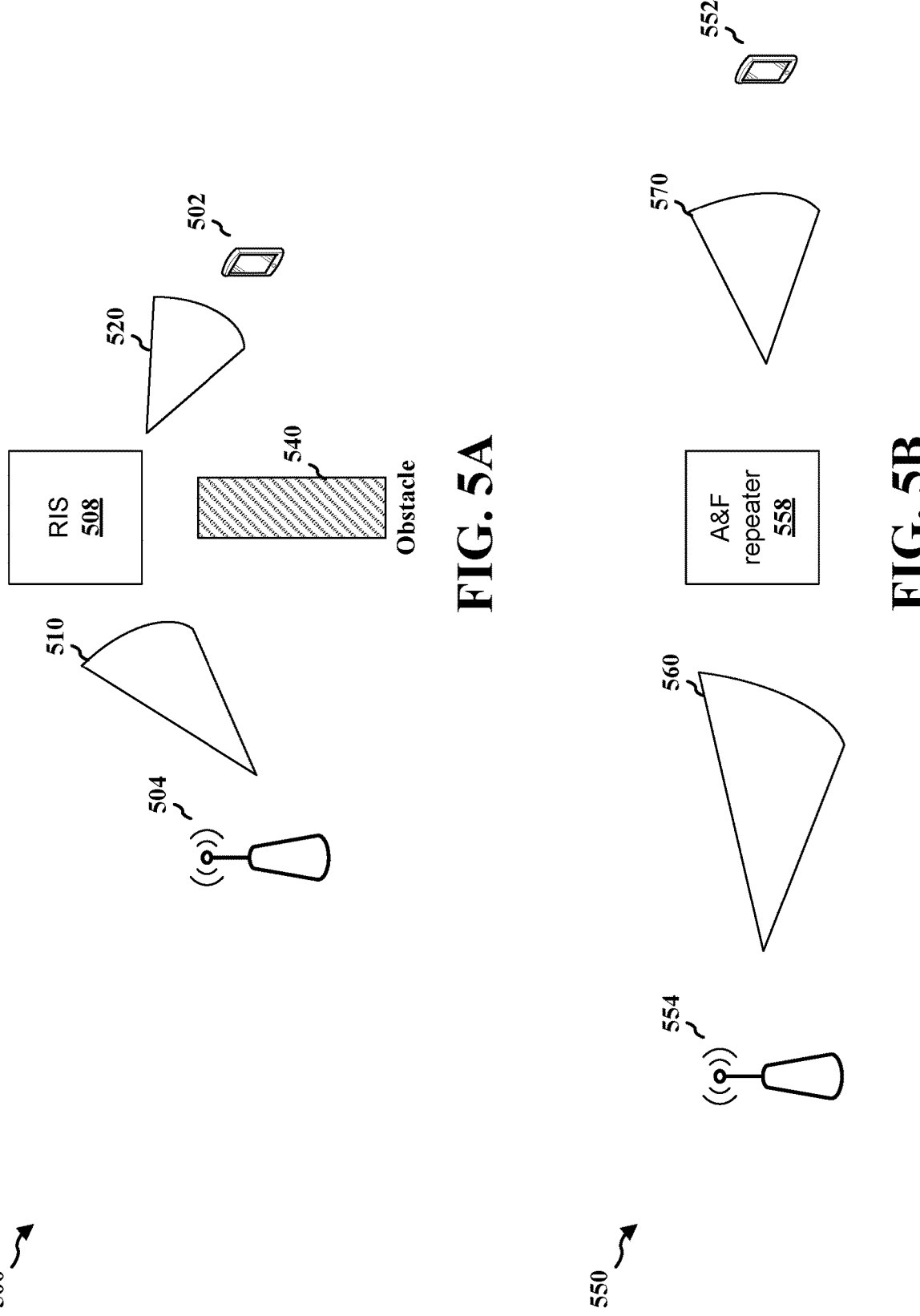
FIG. 5A illustrates a wireless communication including a RIS.
FIG. 5B illustrates a wireless communication including a repeater.

FIG. 5A illustrates a wireless communication 500 including a network node 504, a target UE 502, a RIS 508, and an obstacle 540. The obstacle 540 may include a structure or an object that may block the signal transmitted by the network node 504. Accordingly, from the perspective of the target UE 502, the signal from the network node 504 may have a poor quality, e.g., low signal-to-noise ratio (SNR), high block error rate (BLER), etc. The RIS 508 may be a near passive device that may be configured to reflect the impinging or incident electromagnetic wave (or a received signal) to a desired or configured direction. That is, the RIS 508 may receive a back haul (BH) channel 510 from the network node 504 and reflect the BH channel 510 to an access channel 520 (or a reflected beam) in a first direction towards the target UE 502. Here, the reflection direction may be controlled by the network node 504. That is, based on the base station's understanding of the first direction for the RIS 508 to reflect the BH channel 510, the base station may instruct the RIS 508 to control the propagation of the BH channel 510 to the first direction towards the target UE 502. Here, FIG. 5A illustrates that the RIS 508 is configured to direct the access channel to the target UE 502, but the disclosure is not limited thereto. The target UE 502 may be a target receiver including target network node, In one aspect, the RIS 508 may be the RIS configured to reflect the signal towards the target receiver (e.g., the target UE 502, and by that significantly improves the coverage of the network including the network node 504. In another aspect, the RIS 508 may be the A&F repeater configured to amplify the signal that is received in its analog chain and steers the signal towards the target node (e.g., the target UE 502). Here, the reflection/forward direction may be controlled by the NW, e.g., the network node 504, using signaling indicating the beamforming (BF) weights/command to the RIS 508, based on coverage indicators, e.g., the RSSI/RSRP, that the NW may obtain or get from the target UEs including the target UE 502.

In some aspects, the repeater/RIS 508 may be configured to acquire the BH channel 510 between the network node 504 and the RIS 508, and access channel 520 between the RIS 508 and the target UE 502. In some aspects, certain configuration of operation and/or hardware implementation may be provided to measure the BH channel 510 and/or the access channel 520.

The BF weights may be configured to control both of the direction of the reflection, and the beam width of the reflected signal (e.g., the beam carrying the access channel 520). In one aspect, the BF weight may be configured to control the direction of the reflection/forward for the RIS 508 and direct the access channel 520 to the target UE 502. In another aspect, the BF weight may be configured to control the beam width of the reflected signal (e.g., the beam carrying the access channel 520). This control may provide the NW with the flexibility to manage the tradeoff between the robustness (e.g., providing a wider beam based on the mobility) and the link budget (e.g., providing a narrower beam based on the link budget configuration). In one example, to support the target UE 502 in mobility, the network node 504 may configure control the access channel 520 to have a wider beam. In another example, to improve the channel characteristics of the access channel 520 based on the link budget configuration, the network node 504 may control the access channel 520 to have a narrower beam.

Furthermore, a wider beam may have a tradeoff of increased interference, and the network node 504 may benefit from having as much analytic tools as possible to analyze both of the access channel 520 and the BH channel 510, and optimize the tradeoff between the total channel capacity and link quality. The network node 504 may analyze the BH channel 510 and/or the access channel 520, and the network node 504 may derive delay spread/angular spread/K factor and other parameters that may correlated to the level of interference in the network. Based on the derived parameters, the network node may control the tradeoff between the total interference in the network and the robustness of a specific link (e.g., the access channel 520).

FIG. 5B illustrates a wireless communication 550 including a network node 554, a target UE 552, and an A&F repeater 558. The target UE 552 may be disposed far from the network node 554, or may have an obstacle blocking the LOS from the network node 554. Accordingly, from the perspective of the target UE 552, the signal from the network node 554 may have a poor quality, e.g., low signal-to-noise ratio (SNR), high block error rate (BLER), etc. The A&F repeater 558 may be configured to receive a BH channel 560, amplify and repeat the signal on the access channel 570 for the target UE 552. That is, the A&F repeater 558 may receive the BH channel 560 from the network node 554 and amplify and repeat the BH channel 560 in the access channel 570 in a direction towards the target UE 552. Here, FIG. 5B illustrates that the A&F repeater 558 is configured to direct the access channel to the target UE 552, but the disclosure is not limited thereto. The target UE 552 may be a target receiver including target network node, In one aspect, the link budget of the link in which the A&F repeater is deployed may be determined based on the access channel 570. Here, the link budget of the access channel 570 may be determined by the repeater's power amplification efficiency, which may be determined based at least in part of a dynamic range of the signal received at the A&F repeater, assuming that the A&F repeater 558 is configured to amplify the received signal as is. In another aspect, the power efficiency may be translated to power consumption utilization of a specific hop. For example, some of the hops may not be connected to the power grid, for example repeaters that are supplied by renewal energy source.

The network node 554 may control the peak-to-average-power ratio (PAPR) at the input, e.g., the reception (RX), of the A&F repeater 558 to improve the amplification at the A&F repeater 558 without saturation of the signal. In one example, the network node 554 may apply a dedicated RX PAPR reduction in the transmission (TX), e.g., the output, of the network node 554.

FIG. 6 illustrates a wireless communication 600 including a network node 604, a target UE 602, a RIS/repeater 608, and a controller 606. The RIS/repeater 608 generally may not have any digital processing not to introduce latency. Accordingly, the RIS/repeater 608 may be coupled to a controller 606. Here, the controller 606 may be a UE, but the implementations are not limited there to. For example, the controller 606 may be a dedicated digital controller for controlling the RIS/repeater 608. The coupled controller 606 may be configured to control the RIS/repeater based on a signaling received from the network node 604. The RIS/repeater 608 may receive the BH channel 610 from the network node 604 and amplify and repeat the BH channel 610 in the access channel 620 in a direction towards the target UE 602.

Here, the examples may describe the wireless communication 600 including a single node/repeater to measure the BH channel 610 between the network node 604 and the RIS/repeater 608 (e.g., FIG. 7A). However, the aspects of the current disclosure may not be limited thereto, and they may be valid for a multi hop implementation (e.g., FIG. 7B).

The network node 604 may be configured to obtain a measurement of the BH channel 610 between the network node 604 and the RIS/repeater 608. That is, the network node 604 may transmit, to the controller 606, a signal including a transmission configuration indicator (TCI) state associated with the BH channel 610 between the network node 604 and the RIS/repeater 608, and obtain the measurement of the BH channel 610 between the network node 604 and the RIS/repeater 608 based on the TCI state associated with the BH channel 610. Here, the BH channel 610 may be measured by measuring a reference signal on the BH channel 610.

In one example, for the DL channel of the BH channel 610, the network node 604 may transmit the reference signal on the DL channel of the BH channel 610, and the reference signal may be measured. In another example, for the UL channel of the BH channel 610, the network node 604 may receive the reference signal on the UL channel of the BH channel 610, and the reference signal may be measured.

In some aspects, various implementation may be provided to measure the BH channel. The reference signal on the DL channel may be measured at an analog hardware of at least one of the RIS/repeater or the controller. In one aspect, the network node may transmit the reference signal on the DL channel and configure the controller to measure the DL channel using the analog hardware of the RIS/repeater (Type 1). In another aspect, the network node may transmit the reference signal on the DL channel and configure the controller to measure the DL channel using the analog hardware of the controller (Type 2). The network node may configure the RIS/repeater and/or the controller to transmit the reference signal on the UL channel, and the network node may measure the reference signal on the UL channel of the BH channel. In one aspect, the network node may configure the controller to transmit the reference signal on the UL channel using the analog hardware of the RIS/repeater, and the network node may measure the reference signal received on the UL channel of the BH channel to measure the BH channel (Type 3). In another aspect, the network node may configure the controller to transmit the reference signal on the UL channel using the analog hardware of the controller, and the network node may measure the reference signal received on the UL channel of the BH channel to measure the BH channel (Type 4). In another aspect, the network node may configure the controller to implement a semi-static radar using analog hardware of the RIS/repeater (Type 5).

The network node may signal to the controller which TCI the channel should be measured. That is, the network node may transmit, to the controller, a signaling including the TCI state associated with the BH channel between the network node and the RIS/repeater, and the network node may obtain the measurement of the reference signal of the BH channel based on the TCI state transmitted to the controller. In some aspects, the signaling including the TCI state may be transmitted via at least one of a MAC-CE or an RRC message. In one aspect, the network node may configure a set of TCI states for the controller using the RRC message, and activate/deactivate a TCI state from the set of TCI states using the MAC-CE. In another aspect, the network node may dynamically configure the TCI state for the controller using the MAC-CE.

In some aspects, for the DL channel of the BH channel, the controller may set the RX beam based on the TCI state signaled by the network node. In one aspect, the network node may configure the controller to measure the DL channel using the analog hardware of the RIS/repeater (Type 1), and the controller may set the RX beam of the RIS/repeater to receive the reference signal based on the TCI state signaled by the network node. In another aspect, the network node may configure the controller to measure the DL channel using the analog hardware of the controller (Type 2), and the controller may set the RX beam of the controller to receive the reference signal based on the TCI state signaled by the network node.

The network node may allocate a dedicated resource for DL for the channel measurement. That is, the dedicated resource may refer to the reference signal transmitted by the network node to the at least one of the RIS/repeater or the controller, and the at least one of the RIS/repeater or the controller may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., demodulation reference signal (DMRS), tracking reference signal (TRS), phase TRS (PTRS), channel state information reference signal (CSI-RS), etc.

The network node may transmit the resource including the reference signal with predefined TCI state and at certain time-frequency location indicated to the controller. That is, based on the TCI state signaled by the network node, the controller may control the RIS/repeater or the controller to receive the reference signal in the time-frequency resources on the RX beam associated with the TCI state signaled by the network node.

FIG. 7A is a diagram 700 of the RIS/repeater 708 configured to measure the DL channel of the BH channel. The RIS/repeater 708 may include an analog RX hardware 710 configured to receive the signal (e.g., via the BH channel) from the network node, an analog TX hardware 712 configured to transmit the received signal via a physical antenna (PA) 714, to the access channel. The network node may configure the controller to measure the DL channel using the analog hardware of the RIS/repeater 708 (Type 1). To make sure that the controller 706 may measure an exact DL BH channel experienced by the RIS/repeater 708, the RIS/repeater 708 may include an analog to digital converter (ADC) 716 to couple the signal, sample, and feed the sampled signal to a buffer 720. The controller 706 may retrieve the sampled signal from the buffer 720 to measure the exact DL BH channel experienced by the RIS/repeater 708 without configuring a processing power on the RIS/repeater 708, which may cause a network latency.

The coupling may be configured at the output of the analog RX hardware 710 of the RIS/repeater 708. The analog RX hardware 710 of the RIS/repeater 708 may include one or more analog RX ports, and the coupling/sampling may be configured for each analog RX ports of the analog RX hardware 710. The controller may take the samples from the buffer and measure the desired channel, to measure the reference signal received on the DL channel of the BH channel at the analog RX hardware 710 of the RIS/repeater 708.

In some aspects, the network node may configure the controller to measure the DL channel using the analog hardware of the controller (Type 2). The controller may use its own analog chain including the analog RX hardware of the controller to receive and measure the reference signal on the DL channel of the BH channel between the network node and the RIS/repeater. The controller and the RIS/repeater may have different location and/or different RX beam response, so the channel condition for the controller may be different from that for the RIS/repeater. However, measuring the BH channel using the analog hardware of the controller may provide a cost effective solution without providing dedicated components (e.g., the ADC 716 or the buffer 720 of FIG. 7A), with a trade-off of the channel condition difference between the controller and the RIS/repeater. For example, the controller may be physically located close to a RIS/repeater without the components for coupling, sampling, and/or storing the incoming signal.

The controller may signal the measured channel to the network node. That is, the controller may generate a channel report of the BH channel based on the reference signal received on the DL channel, and transmit the channel report including the measurement of the BH channel. The measurement of the BH channel may be transmitted to the network node using the MAC-CE or the RRC message. For example, the measurement of the BH channel may include a vector of the time units (e.g., in seconds) or a vector of the tap values (e.g., in complex form). The measurements of the BH channel may be provided for each layer and/or each RX port.

In case of channel reciprocity, the network node may measure the UL channel on the BH channel. That is, the network node may configure the RIS/repeater and/or the controller to transmit the reference signal on the UL channel, and the network node may measure the reference signal on the UL channel of the BH channel. In one aspect, the network node may configure the controller to transmit the reference signal on the UL channel using the analog hardware of the RIS/repeater, and the network node may measure the reference signal received on the UL channel of the BH channel to measure the BH channel (Type 3). In another aspect, the network node may configure the controller to transmit the reference signal on the UL channel using the analog hardware of the controller, and the network node may measure the reference signal received on the UL channel of the BH channel to measure the BH channel (Type 4).

The network node may allocate a dedicated resource for UL for the channel measurement. That is, the dedicated resource may refer to the reference signal transmitted by the at least one of the RIS/repeater or the controller, and the network node may measure the dedicated resource received on the BH channel to perform the BH channel measurement. In one example, the reference signal may include the dedicated resource configured with various parameters, e.g., pilot density, periodicity, etc. In another example, at least one parameter of the reference signal for measuring the BH channel may be referred from the parameters of another reference signal, e.g., demodulation reference signal (DMRS), sounding reference signal (SRS), etc.

FIG. 7B is a diagram 750 of the RIS/repeater 708 configured to measure the UL channel of the BH channel. The RIS/repeater 708 may include an analog RX hardware 710 configured to receive the signal (e.g., via the access channel) from a target device (e.g., the target UE), an analog TX hardware 712 configured to transmit the received signal via a PA 714, to the BH channel. The network node may configure the controller 706 to transmit the reference signal to the network node using the analog hardware of the RIS/repeater 708 (Type 3). To make sure that the waveform of the reference signal transmitted to the network node may experience the exact channel that is experienced by the repeater, the RIS/repeater 708 may include a buffer 720 including the reference signal and a digital to analog converter (DAC) 718 to switch from the analog RX hardware 710 to the DAC 718 and transmit the reference signal stored in the buffer 720 without configuring a processing power on the RIS/repeater 708, which may cause a network latency. The switching may be configured at the output of the analog RX hardware 710 and the input of the analog RX hardware 712 of the RIS/repeater 708. The switching may be configured for each analog TX ports of the analog TX hardware 710.

In some aspects, the network node may configure the controller to transmit the reference signal on the UL channel using the analog hardware of the controller, and the network node may measure the reference signal received on the UL channel of the BH channel to measure the BH channel (Type 4). The controller may use its own analog chain including the analog TX hardware of the controller to transmit the reference signal on the UL channel of the BH channel between the network node and the RIS/repeater. The controller and the RIS/repeater may have different location and/or different TX beam response, so the channel condition for the controller may be different from that for the RIS/repeater. However, measuring the BH channel using the reference signal transmitted by the analog hardware of the controller may provide a cost effective solution without providing dedicated components (e.g., the DAC 718 or the buffer 720 of FIG. 7B), with a trade-off of the channel condition difference between the controller and the RIS/repeater. For example, the controller may be physically located close to a RIS/repeater without the components for switching to transmitting the reference signal.

The network node may measure the channel that may be equivalent to the BH channel. That is, the network node may measure the reference signal transmitted by at least one of the RIS/repeater or the controller on the UL channel of the BH channel, and measure the BH channel between the network node and the RIS/repeater.

Figure 8:
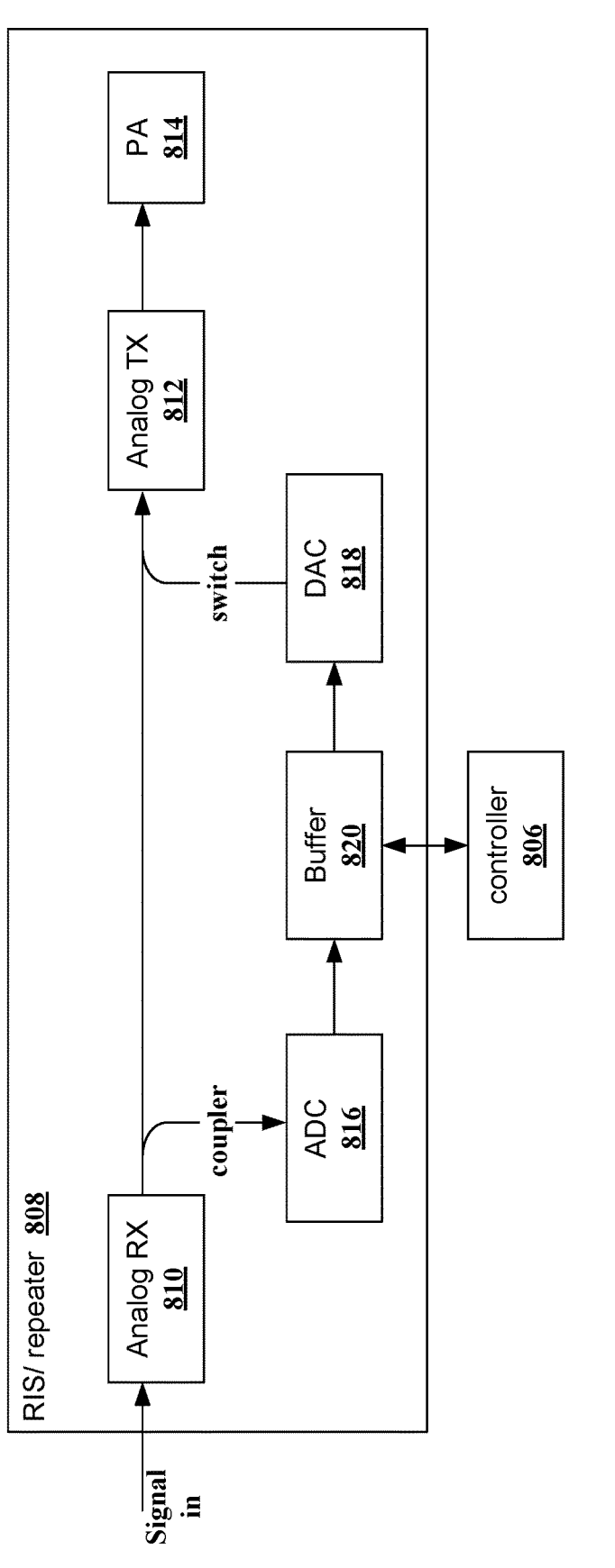
FIG. 8 is a diagram of the RIS/repeater configured to implement the semi-static radar.

FIG. 8 is a diagram 800 of the RIS/repeater 808 configured to implement the semi-static radar. That is, the network node may configure the controller to implement a semi-static radar using analog hardware of the RIS/repeater 808 (Type 5). The idea of the semi-static radar may be the network node requesting or configuring a specific node to store a RX waveform at a specific time, duration, resource allocation, and/or RX beam, and then the specific node to echo back the stored RX waveform at a specific time and duration to the network node. Here, the requesting or configuring of the semi-static radar may be implicitly provided based on the defined TCI state. That is, the TCI state may be configured or defined with the semi-static radar configuration, and the network node may configure or activate/deactivate the TCI state to request or configure the RIS/repeater 808 to perform the semi-static radar function. The network node may derive or measure the channel from the echoed back waveform based on the RX waveform.

In one aspect, by adding a digital processing on the echo signal, e.g., a complex conjugate processing, the network node may perform a power delay profile (PDP) estimation for example, if h·s is received and (h·s)* is echoed back, the network node may get |h·s|², from which the PDP may be extracted. In comparison, if the echo signal is transmitted with the RS signal received as is, the network node may estimate a convolution of (h, h), from which the network node may extract the h after some processing. Accordingly, the network node and the RIS/repeater 808 may perform a half-duplex radar operation where the network node may not need the full-duplex capability.

The RIS/repeater 808 may include an analog RX hardware 810 configured to receive the signal (e.g., via the BH channel) from the network node, an analog TX hardware 812 configured to transmit the received signal via a PA 814. To store the received RX waveform and echo back the received RX waveform, the RIS/repeater 708 may include a buffer 820, an ADC 816 to couple the RX waveform received at the analog RX hardware to the buffer 820, and a DAC 818 configured to switch from the analog RX hardware 810 to the DAC 818 and transmit the reference signal stored in the buffer 820 without configuring a processing power on the RIS/repeater 808.

The network node will control the controller 806, and the controller 806 may control the coupler regarding when and how to trigger the waveform recording. That is, based on the configuration of the RX beam and/or the time allocation of the resources, the controller 806 may control the coupler to trigger or start recording the RX waveform received at the analog RX hardware 810, instruct the ADC 816 to store the RX waveform to the buffer 820. The network node may also control the controller 806 to control the switch regarding when and how to trigger the transmission of the recorded echo of the RX waveform. That is, based on the configuration of the TX beam and/or time allocation of the resources, the controller 806 may control the switch to trigger or start transmitting the echo signal of the RX waveform stored in the buffer 820 via the analog TX hardware 812 to the PA 814. The network node may measure and extract the BH channel from the received echo signal of the RX waveform.

In some aspects, for a multi hop configuration, the network node may measure the channel between each hop and the network node. Then, if requested for a specific motivation, the network may extract the channel between each hop. That is, multiple hops of the RIS/repeater may be configured to transmit the signal from the network node to a target device (e.g., the target UE). For each hop, the network node may be configured to measure the BH channel between the network node and each RIS/repeater. That is, the network node may measure the BH channel between the network node and the last hop, and by combining the BH channel measurement between the network node and the last hop with a channel measurement between the target node and the network node (e.g., by using the SRS), the network node may extract the access channel between the last hop and target node (target UE for example)

The network node may combine any number of different types of measurements (e.g., Type 1, Type 2, Type 3, Type 4, or Type 5). The network node may use the one one of the different types of measurements to measure the BH channel between each hop (e.g., RIS/repeat) and the network node, and the network node may measure the overall channel between the network node and the target node (e.g., the target UE). The network node may also use the SRS to measure the overall channel between the network node and the target UE. Based on the measurements between each hop and the network node and the overall channel measurement between the target node and the network node, the network node may extract any of the BH channel between each hop. In one example, the network node may be connected to the target node with N hops including (N–1) RIS/repeaters. The network node may measure a $K^{th}$ BH channel between the network node and a $K^{th}$ RIS/repeater and a $(K–1)^{th}$ BH channel between the network node and a $(K–1)^{th}$ RIS/repeater, and the network node may extract the BH channel between the $(K–1)^{th}$ RIS/repeater and the $K^{th}$ RIS/repeater based on the measurement of the $K^{th}$ BH channel and the measurement of the $(K–1)^{th}$ BH channel. Also, the network node may measure an $(N–1)^{th}$ BH channel between the network node and an $(N–1)^{th}$ RIS/repeater and an $N^{th}$ BH channel between the network node and the target node, and the network node may extract the BH channel between the $(N–1)^{th}$ RIS/repeater and the target node based on the measurement of the $N^{th}$ BH channel and the measurement of the $(N–1)^{th}$ BH channel.

Based on the measurement of the BH channels between multi hops of the RIS/repeaters or between the RIS/repeater and the network node, the network node may improve the implementation of the RIS/repeater. In one example, the network node may improve the efficiency of the RIS by optimizing the RIS configuration (e.g., phase shifting, direction, beam focusing, beam width, etc.) based on the measurement of the BH channels. In another example, the network node may improve the power amplification of the repeater (e.g., the A&F repeater) based on the measurement of the BH channels.

Figure 9:
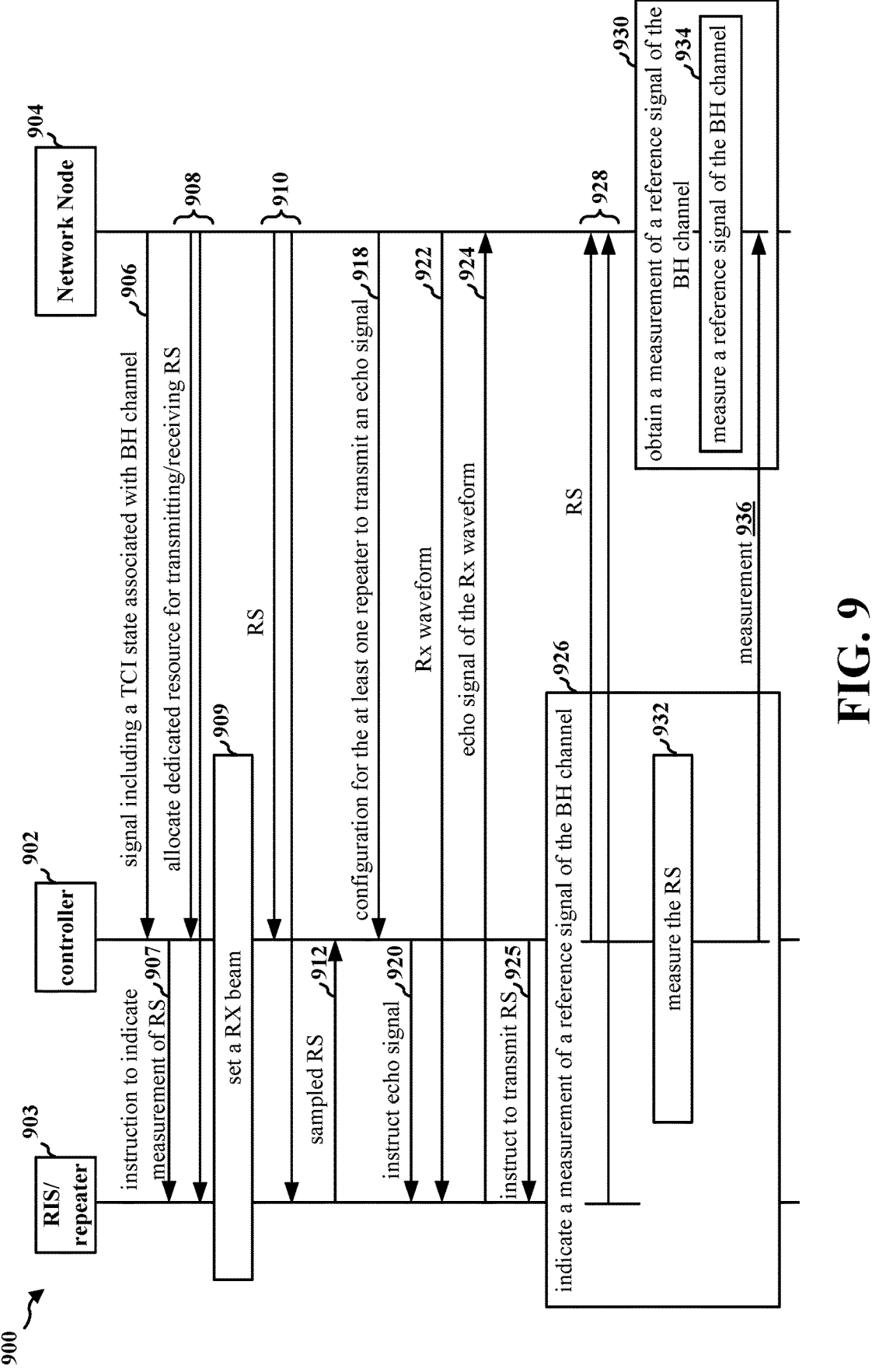
FIG. 9 is a call-flow diagram of a method of wireless communication.

FIG. 9 is a call-flow diagram 900 of a method of wireless communication. The call-flow diagram 900 may include a controller 902, a RIS/repeater 903, and a network node 904. The network node 904 may configure the controller 902 and the RIS/repeater 903 to measure one or more BH channels between the network node 904 and the RIS/repeater 903 or between multiple RIS/repeaters for multi-hop implementation. The network node 904 may modify or optimize the configuration of the RIS/repeater 903 based on the measurement of the one or more BH channels.

At 906, the network node 904 may transmit a signal including a TCI state associated with at least one BH channel between the network node 904 and at least one repeater, the signal being transmitted for a controller 902 associated with the at least one repeater. The controller 902 may receive a signal including a TCI state associated with at least one BH channel between a network node 904 and the at least one repeater, the signal being obtained from the network node 904 associated with the at least one repeater.

In one aspect, the at least one BH channel may include a DL channel, and the TCI state associated with the at least one BH channel indicates for the controller 902 associated with the at least one repeater to measure the reference signal on the DL channel. In another aspect, the at least one BH channel may include a UL channel, and the TCI state associated with the at least one BH channel indicates for the controller 902 associated with the at least one repeater to measure the reference signal on the UL channel.

In some aspects, the reference signal on the DL channel may be measured at an analog hardware of at least one of the RIS/repeater 903 or the controller 902. In one aspect, the network node 904 may transmit the reference signal on the DL channel and configure the controller 902 to measure the DL channel using the analog hardware of the RIS/repeater 903 (Type 1). In another aspect, the network node 904 may transmit the reference signal on the DL channel and configure the controller 902 to measure the DL channel using the analog hardware of the controller 902 (Type 2). The network node 904 may configure the RIS/repeater 903 and/or the controller 902 to transmit the reference signal on the UL channel, and the network node 904 may measure the reference signal on the UL channel of the BH channel. In one aspect, the network node 904 may configure the controller 902 to transmit the reference signal on the UL channel using the analog hardware of the RIS/repeater 903, and the network node 904 may measure the reference signal received on the UL channel of the BH channel to measure the BH channel (Type 3). In another aspect, the network node 904 may configure the controller 902 to transmit the reference signal on the UL channel using the analog hardware of the controller 902, and the network node 904 may measure the reference signal received on the UL channel of the BH channel to measure the BH channel (Type 4). In another aspect, the network node 904 may configure the controller 902 to implement a semi-static radar using analog hardware of the RIS/repeater 903 (Type 5).

The network node 904 may signal to the controller 902 which TCI the channel should be measured. That is, the network node 904 may transmit, to the controller 902, a signaling including the TCI state associated with the BH channel between the network node 904 and the RIS/repeater 903, and the network node 904 may obtain the measurement of the reference signal of the BH channel based on the TCI state transmitted to the controller 902. In some aspects, the signaling including the TCI state may be transmitted via at least one of a MAC-CE or an RRC message. In one aspect, the network node 904 may configure a set of TCI states for the controller 902 using the RRC message, and activate/deactivate a TCI state from the set of TCI states using the MAC-CE. In another aspect, the network node 904 may dynamically configure the TCI state for the controller 902 using the MAC-CE.

At 907, the RIS/repeater 903 may receive an instruction from a controller 902 to indicate a measurement of a reference signal of at least one BH channel based on the signal. Instruction to indicate the measurement of the reference signal of the at least one BH channel may be based on the signal received at 906.

At 908, the network node 904 may allocate a dedicated resource on the DL channel for transmitting the reference signal. The network node 904 may allocate a dedicated resource on the UL channel for receiving the reference signal. The controller 902 may receive an allocation of a dedicated resource on the DL channel for measuring the reference signal. The controller 902 may receive an allocation of a dedicated resource on the UL channel for transmitting the reference signal. The RIS/repeater 903 may receive an allocating of a dedicated resource for measuring the DL channel, where the reference signal may be received on the dedicated resource of the DL channel. The RIS/repeater 903 may receive an allocating of a dedicated resource for measuring the UL channel, where the reference signal may be transmitted on the dedicated resource of the UL channel.

In one aspect, the network node 904 may allocate a dedicated resource for DL for the channel measurement. That is, the dedicated resource may refer to the reference signal transmitted by the network node 904 to the at least one of the RIS/repeater 903 or the controller 902, and the at least one of the RIS/repeater 903 or the controller 902 may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, TRS, PTRS, CSI-RS, etc.

In another aspect, the network node 904 may allocate a dedicated resource for UL for the channel measurement. That is, the dedicated resource may refer to the reference signal transmitted by the at least one of the RIS/repeater 903 or the controller 902, and the network node 904 may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, SRS, etc.

At 909, the controller 902 may set a RX beam to be associated with the TCI state, the DL channel including the reference signal being received on the Rx beam. The RIS/repeater 903 may receive a configuration of a Rx beam to be associated with a TCI state, the DL channel being received via the Rx beam.

For the DL channel of the BH channel, the controller 902 may set the RX beam based on the TCI state signaled by the network node 904. In one aspect, the network node 904 may configure the controller 902 to measure the DL channel using the analog hardware of the RIS/repeater 903 (Type 1), and the controller 902 may set the RX beam of the RIS/repeater 903 to receive the reference signal based on the TCI state signaled by the network node 904. In another aspect, the network node 904 may configure the controller 902 to measure the DL channel using the analog hardware of the controller 902 (Type 2), and the controller 902 may set the RX beam of the controller 902 to receive the reference signal based on the TCI state signaled by the network node 904.

At 910, the network node 904 may transmit the reference signal in the dedicated resource in the DL channel associated with the TCI state of the signal. The network node 904 may transmit the resource including the reference signal with predefined TCI state and at certain time-frequency location indicated to the controller 902. That is, based on the TCI state signaled by the network node 904, the controller 902 may control the RIS/repeater 903 or the controller 902 to receive the reference signal in the time-frequency resources on the RX beam associated with the TCI state signaled by the network node 904.

The RIS/repeater 903 may receive the reference signal in the dedicated resource in the DL channel associated with the TCI state of the signal. In one aspect, the network node 904 may transmit the reference signal on the DL channel and configure the controller 902 to measure the DL channel using the analog hardware of the RIS/repeater 903 (Type 1).

The controller 902 may receive the reference signal in the dedicated resource in the DL channel associated with the TCI state of the signal. Here, the reference signal may be received and measured using the analog hardware of the controller 902. In one aspect, the network node 904 may transmit the reference signal on the DL channel and configure the controller 902 to measure the DL channel using the analog hardware of the controller 902 (Type 2). The controller 902 may use its own analog chain including the analog RX hardware of the controller 902 to receive and measure the reference signal on the DL channel of the BH channel between the network node 904 and the RIS/repeater 903. The controller 902 and the RIS/repeater 903 may have different location and/or different RX beam response, so the channel condition for the controller 902 may be different from that for the RIS/repeater 903. However, measuring the BH channel using the analog hardware of the controller 902 may provide a cost effective solution without providing dedicated components (e.g., the ADC 716 or the buffer 720 of FIG. 7A), with a trade-off of the channel condition difference between the controller 902 and the RIS/repeater 903. For example, the controller 902 may be physically located close to a RIS/repeater 903 without the components for coupling, sampling, and/or storing the incoming signal.

The RIS/repeater 903 may include an analog RX hardware configured to receive the signal (e.g., via the BH channel) from the network node 904, an analog TX hardware configured to transmit the received signal via a PA, to the access channel. The network node 904 may configure the controller 902 to measure the DL channel using the analog hardware of the RIS/repeater 903 (Type 1). To make sure that the controller 902 may measure an exact DL BH channel experienced by the RIS/repeater 903, the RIS/repeater 903 may include an ADC to couple the signal, sample, and feed the sampled signal to a buffer. The controller 902 may retrieve the sampled signal from the buffer to measure the exact DL BH channel experienced by the RIS/repeater 903 without configuring a processing power on the RIS/repeater 903, which may cause a network latency. The coupling may be configured at the output of the analog RX hardware of the RIS/repeater 903. The analog RX hardware of the RIS/repeater 903 may include one or more analog RX ports, and the coupling/sampling may be configured for each analog RX ports of the analog RX hardware. The controller 902 may take the samples from the buffer and measure the desired channel, to measure the reference signal received on the DL channel of the BH channel at the analog RX hardware of the RIS/repeater 903.

At 912, the controller 902 may obtain a sample of the DL channel including the reference signal from a buffer of the RIS/repeater 903 to measure the reference signal based on the sample of the DL channel obtained. Here, the reference signal may be measured using the analog hardware of the at least one repeater. The controller 902 may obtain a sample of the DL channel including the reference signal to a buffer of the repeater, and the reference signal is transmitted to the controller 902 based on the sample of the DL channel obtained.

In one aspect, the network node 904 may configure the controller 902 to implement a semi-static radar using analog hardware of the RIS/repeater 903 (Type 5). The idea of the semi-static radar may be the network node 904 requesting or configuring a specific node to store a RX waveform at a specific time, duration, resource allocation, and/or RX beam, and then the specific node to echo back the stored RX waveform at a specific time and duration to the network node 904. Here, the requesting or configuring of the semi-static radar may be implicitly provided based on the defined TCI state. That is, the TCI state may be configured or defined with the semi-static radar configuration, and the network node 904 may configure or activate/deactivate the TCI state to request or configure the RIS/repeater 903 to perform the semi-static radar function. The network node 904 may derive or measure the channel from the echoed back waveform based on the RX waveform.

At 918, the network node 904 may transmit a configuration for the at least one repeater to transmit an echo signal of a RX waveform. The controller 902 may receive a configuration for the at least one repeater to transmit an echo signal of a RX waveform.

At 920, the controller 902 may instruct the at least one repeater to transmit the echo signal of the Rx waveform to the network node 904 based at least in part on the configuration to transmit the echo signal of the Rx waveform. The RIS/repeater 903 may receive an instruction from the controller 902 to transmit an echo signal of the Rx waveform, the instruction including a configuration for transmitting the echo signal.

The controller 902 may control the coupler regarding when and how to trigger the waveform recording. That is, based on the configuration of the RX beam and/or the time allocation of the resources, the controller 902 may control the coupler to trigger or start recording the RX waveform received at the analog RX hardware, instruct the ADC to store the RX waveform to the buffer. The network node 904 may also control the controller 902 to control the switch regarding when and how to trigger the transmission of the recorded echo of the RX waveform. Based on the configuration of the TX beam and/or time allocation of the resources, the controller 902 may control the switch to trigger or start transmitting the echo signal of the RX waveform stored in the buffer via the analog TX hardware to the PA.

The RIS/repeater 903 may include an analog RX hardware configured to receive the signal (e.g., via the BH channel) from the network node 904, an analog TX hardware configured to transmit the received signal via a PA. To store the received RX waveform and echo back the received RX waveform, the RIS/repeater 903 may include a buffer, an ADC to couple the RX waveform received at the analog RX hardware to the buffer, and a DAC configured to switch from the analog RX hardware to the DAC and transmit the reference signal stored in the buffer without configuring a processing power on the RIS/repeater 903.

At 922, the network node 904 may transmit an RX waveform to the RIS/repeater 903. The RIS/repeater 903 may receive an RX waveform from a network node 904.

At 924, the RIS/repeater 903 may transmit the echo signal of the Rx waveform to the network node 904 based on the configuration for transmitting the echo signal. The network node 904 may receive the echo signal of the Rx waveform from the at least one repeater, the echo signal being based at least in part on the configuration for the at least one repeater to transmit the echo signal of the Rx waveform. That is, the RIS/repeater 903 may store the RX waveform received at 922 to the buffer, and transmit the echo signal of the RX waveform stored in the buffer via the analog TX hardware to the PA, and the echo signal of the RX waveform may be transmitted to the network node 904.

At 925, the controller 902 may instruct the at least one repeater to switch to transmitting the reference signal using an analog transmitter on the UL channel (Type 3 or Type 4). The RIS/repeater 903 may receive the instruction of the to switch to transmit the reference signal using an analog transmitter on the UL channel (Type 3 or Type 4).

At 926, the controller 902 may indicate a measurement of a reference signal of the at least one BH channel based on the signal including the TCI state associated with the at least one BH channel. The RIS/repeater 903 may indicate the measurement of the reference signal of the at least one BH channel based on the signal. 926 may include 928, 932, and 936.

At 928, the network node 904 may receive the reference signal on the UL channel of the at least one BH channel using an analog hardware of at least one of the at least one repeater or the controller 902. The RIS/repeater 903 may transmit the reference signal on the UL channel to the controller 902. In one aspect, the network node 904 may configure the controller 902 to transmit the reference signal on the UL channel using the analog hardware of the RIS/repeater 903, and the network node 904 may measure the reference signal received on the UL channel of the BH channel to measure the BH channel (Type 3). To make sure that the waveform of the reference signal transmitted to the network node 904 may experience the exact channel that is experienced by the repeater, the RIS/repeater 903 may include a buffer including the reference signal and a DAC to switch from the analog RX hardware to the DAC and transmit the reference signal stored in the buffer without configuring a processing power on the RIS/repeater 903, which may cause a network latency. The switching may be configured at the output of the analog RX hardware and the input of the analog RX hardware of the RIS/repeater 903. The switching may be configured for each analog TX ports of the analog TX hardware.

The controller 902 may transmit the reference signal on the UL channel of the at least one BH channel to the network node 904. Here, the UL channel may be transmitted using an analog hardware of the controller 902. In one aspect, the network node 904 may configure the controller 902 to transmit the reference signal on the UL channel using the analog hardware of the controller 902, and the network node 904 may measure the reference signal received on the UL channel of the BH channel to measure the BH channel (Type 4). The controller 902 may use its own analog chain including the analog TX hardware of the controller 902 to transmit the reference signal on the UL channel of the BH channel between the network node 904 and the RIS/repeater 903. The controller 902 and the RIS/repeater 903 may have different location and/or different TX beam response, so the channel condition for the controller 902 may be different from that for the RIS/repeater 903. However, measuring the BH channel using the reference signal transmitted by the analog hardware of the controller 902 may provide a cost effective solution without providing dedicated components (e.g., the DAC 718 or the buffer 720 of FIG. 7B), with a trade-off of the channel condition difference between the controller 902 and the RIS/repeater 903. For example, the controller 902 may be physically located close to a RIS/ repeater 903 without the components for switching to trans- mitting the reference signal.

At 932, the controller 902 may measure the reference signal received on the DL channel. Here, the reference signal may be received at 910 or the sampled reference signal may be received at 912. In one example, based on the network node 904 configuring the controller 902 to measure the DL channel using the analog hardware of the RIS/repeater 903 (Type 1), the controller 902 may measure the sampled RS received from the RIS/repeater 903 at 912. In another example, based on the network node 904 configuring the controller 902 to measure the DL channel using the analog hardware of the controller 902 (Type 2), the controller 902 may measure the RS received by the analog hardware of the controller 902 at 910.

At 936, the controller 902 may transmit the measurement of the reference signal received on the DL channel. Here, the measurement of the reference signal may be received via at least one of a MAC-CE or an RRC message. The measure- ment of the reference signal may include a first vector of time units or a second vector of complex tap values. The measurement of the reference signal may be per layer and reception port, e.g., a measurement for each combination of layer and reception port.

At 930, the network node 904 may obtain a measurement of a reference signal of the at least one BH channel based on the signal including the TCI state associated with the at least one BH channel. 930 may include 934 and 936.

At 934, the network node 904 may measure the reference signal received at 928. The network node 904 may measure the channel that may be equivalent to the BH channel. That is, the network node 904 may measure the reference signal transmitted by at least one of the RIS/repeater 903 (Type 3) or the controller 902 (Type 4) on the UL channel of the BH channel, and measure the BH channel between the network node 904 and the RIS/repeater 903. Based on Type 5, the network node 904 may measure the echo signal of the RX waveform received at 924. The network node 904 may measure and extract the BH channel from the received echo signal of the RX waveform. In one aspect, by adding a digital processing on the echo signal, e.g., a complex con- jugate processing, the network node 904 may perform a power delay profile (PDP) estimation for example, if h·s is received and (h·s)* is echoed back, the network node 904 may get |h·s|$^2$, from which the PDP may be extracted. In comparison, if the echo signal is transmitted with the RS signal received as is, the network node 904 may estimate a convolution of (h, h), from which the network node 904 may extract the h after some processing. Accordingly, the net- work node 904 and the RIS/repeater 903 may perform a half-duplex radar operation where the network node 904 may not need the full-duplex capability.

At 936, the network node 904 may receive, from the controller 902 associated with the at least one repeater, the measurement of the reference signal on the DL channel. In one aspect, the at least on repeater may include a first repeater and a second repeater, and to obtain the measure- ment of the at least one BH channel, the network node 904 may be configured to obtain a first measurement of a first BH channel between the network node 904 and the first repeater, obtain a second measurement of a second BH channel between the network node 904 and the second repeater, and obtain a third measurement of a third BH channel between the first repeater and the second repeater based on the first measurement and the second measurement.

In some aspects, for a multi hop configuration, the net- work node 904 may measure the channel between each hop and the network node 904. Then, if requested for a specific motivation, the network may extract the channel between each hop. That is, multiple hops of the RIS/repeater 903 may be configured to transmit the signal from the network node 904 to a target device (e.g., the target UE). For each hop, the network node 904 may be configured to measure the BH channel between the network node 904 and each RIS/ repeater 903. That is, the network node 904 may measure the BH channel between the network node 904 and the last hop, and by combining the BH channel measurement between the network node 904 and the last hop with a channel measure- ment between the target node and the network node 904 (e.g., by using the SRS), the network node 904 may extract the access channel between the last hop and target node (target UE for example)

The network node 904 may combine any number of different types of measurements (e.g., Type 1, Type 2, Type 3, Type 4, or Type 5). The network node 904 may use the one of the different types of measurements to measure the BH channel between each hop (e.g., RIS/repeat) and the network node 904, and the network node 904 may measure the overall channel between the network node 904 and the target node (e.g., the target UE). The network node 904 may also use the SRS to measure the overall channel between the network node 904 and the target UE. Based on the mea- surements between each hop and the network node 904 and the overall channel measurement between the target node and the network node 904, the network node 904 may extract any of the BH channel between each hop. In one example, the network node 904 may be connected to the target node with N hops including (N−1) RIS/repeaters. The network node 904 may measure a K$^{th}$ BH channel between the network node and a K$^{th}$ RIS/repeater and a (K−1)$^{th}$ BH channel between the network node and a (K−1)th RIS/ repeater, and the network node 904 may extract the BH channel between the (K−1)$^{th}$ RIS/repeater and the K$^{th}$ RIS/ repeater based on the measurement of the K$^{th}$ BH channel and the measurement of the (K−1)$^{th}$ BH channel. Also, the network node 904 may measure an (N−1)$^{th}$ BH channel between the network node 904 and an (N−1)$^{th}$ RIS/repeater and an N$^{th}$ BH channel between the network node 904 and the target node, and the network node 904 may extract the BH channel between the (N−1)$^{th}$ RIS/repeater and the target node based on the measurement of the N$^{th}$ BH channel and the measurement of the (N−1)$^{th}$ BH channel.

Based on the measurement of the BH channels between multi hops of the RIS/repeaters or between the RIS/repeater 903 and the network node 904, the network node 904 may improve the implementation of the RIS/repeater 903. In one example, the network node 904 may improve the efficiency of the RIS by optimizing the RIS configuration (e.g., phase shifting, direction, beam focusing, beam width, etc.) based on the measurement of the BH channels. In another example, the network node 904 may improve the power amplification of the repeater (e.g., the A&F repeater) based on the measurement of the BH channels.

Figure 10:
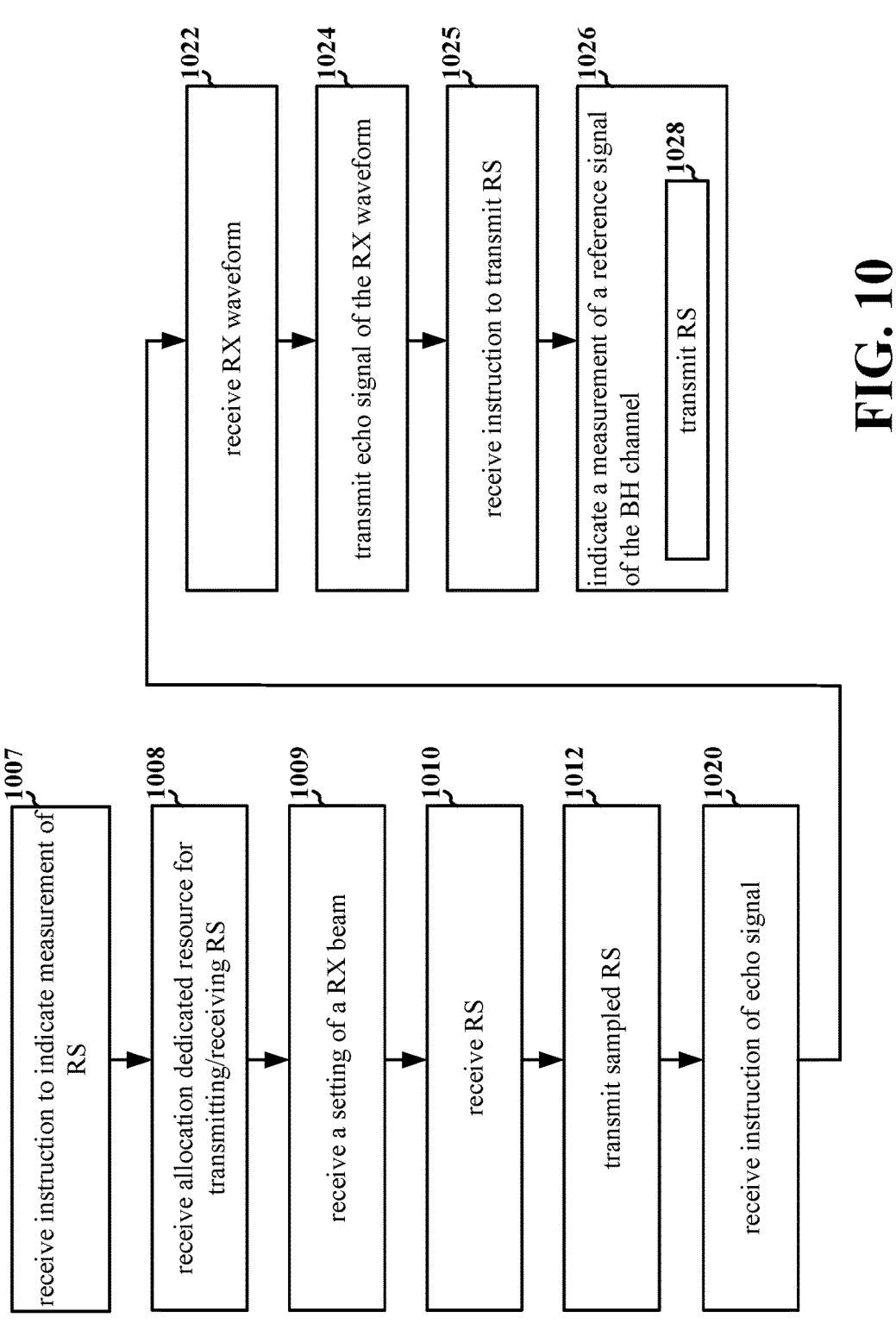
FIG. 10 is a flowchart of a method of wireless communication.

FIG. 10 is a flowchart 1000 of a method of wireless communication. The method may be performed by a RIS/ repeater (e.g., the RIS/repeater 103/903; the apparatus 1602). A network node may configure a controller and the RIS/repeater to measure one or more BH channels between the network node and the RIS/repeater or between multiple RIS/repeaters for multi-hop implementation. The network node may modify or optimize the configuration of the RIS/repeater based on the measurement of the one or more BH channels.

At 1007, the RIS/repeater may receive an instruction from a controller to indicate a measurement of a reference signal of at least one BH channel based on the signal. Instruction to indicate the measurement of the reference signal of the at least one BH channel may be based on the signal received. For example, at 907, the RIS/repeater 903 may receive an instruction from a controller 902 to indicate a measurement of a reference signal of at least one BH channel based on the signal. Furthermore, 1007 may be performed by a BH channel measurement component 198.

At 1008, the RIS/repeater may receive an allocating of a dedicated resource for measuring the DL channel, where the reference signal may be received on the dedicated resource of the DL channel, or receive an allocating of a dedicated resource for measuring the UL channel, where the reference signal may be transmitted on the dedicated resource of the UL channel. For example, at 908, the RIS/repeater 903 may receive an allocating of a dedicated resource for measuring the DL channel, where the reference signal may be received on the dedicated resource of the DL channel, or receive an allocating of a dedicated resource for measuring the UL channel, where the reference signal may be transmitted on the dedicated resource of the UL channel. Furthermore, 1008 may be performed by the BH channel measurement component 198.

In one aspect, the network node may allocate a dedicated resource for DL for the channel measurement. That is, the dedicated resource may refer to the reference signal transmitted by the network node to the at least one of the RIS/repeater or the controller, and the at least one of the RIS/repeater or the controller may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, TRS, PTRS, CSI-RS, etc. In another aspect, the network node may allocate a dedicated resource for UL for the channel measurement. That is, the dedicated resource may refer to the reference signal transmitted by the at least one of the RIS/repeater or the controller, and the network node may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, SRS, etc.

At 1009, the RIS/repeater may receive a configuration of a Rx beam to be associated with a TCI state, the DL channel being received via the Rx beam. For the DL channel of the BH channel, the controller may set the RX beam based on the TCI state signaled by the network node. In one aspect, the network node may configure the controller to measure the DL channel using the analog hardware of the RIS/repeater (Type 1), and the controller may set the RX beam of the RIS/repeater to receive the reference signal based on the TCI state signaled by the network node. In another aspect, the network node may configure the controller to measure the DL channel using the analog hardware of the controller (Type 2), and the controller may set the RX beam of the controller to receive the reference signal based on the TCI state signaled by the network node. For example, at 909, the RIS/repeater 903 may receive a configuration of a Rx beam to be associated with a TCI state, the DL channel being received via the Rx beam. Furthermore, 1009 may be performed by a BH channel measurement component 198.

At 1010, the RIS/repeater may receive the reference signal in the dedicated resource in the DL channel associated with the TCI state of the signal. In one aspect, the network node may transmit the reference signal on the DL channel and configure the controller to measure the DL channel using the analog hardware of the RIS/repeater (Type 1). For example, at 910, the RIS/repeater 903 may receive the reference signal in the dedicated resource in the DL channel associated with the TCI state of the signal. Furthermore, 1010 may be performed by the BH channel measurement component 198.

The RIS/repeater may include an analog RX hardware configured to receive the signal (e.g., via the BH channel) from the network node, an analog TX hardware configured to transmit the received signal via a PA, to the access channel. The network node may configure the controller to measure the DL channel using the analog hardware of the RIS/repeater (Type 1). To make sure that the controller may measure an exact DL BH channel experienced by the RIS/repeater, the RIS/repeater may include an ADC to couple the signal, sample, and feed the sampled signal to a buffer. The controller may retrieve the sampled signal from the buffer to measure the exact DL BH channel experienced by the RIS/repeater without configuring a processing power on the RIS/repeater, which may cause a network latency. The coupling may be configured at the output of the analog RX hardware of the RIS/repeater. The analog RX hardware of the RIS/repeater may include one or more analog RX ports, and the coupling/sampling may be configured for each analog RX ports of the analog RX hardware. The controller may take the samples from the buffer and measure the desired channel, to measure the reference signal received on the DL channel of the BH channel at the analog RX hardware of the RIS/repeater.

At 1012, the RIS/repeater may transmit a sample of the DL channel including the reference signal from a buffer of the RIS/repeater to the controller to measure the reference signal based on the sample of the DL channel obtained. Here, the reference signal may be measured using the analog hardware of the at least one repeater. The controller may obtain a sample of the DL channel including the reference signal to a buffer of the repeater, and the reference signal is transmitted to the controller based on the sample of the DL channel obtained. For example, at 912, the RIS/repeater 903 may transmit a sample of the DL channel including the reference signal from a buffer of the RIS/repeater 903 to the controller 902 to measure the reference signal based on the sample of the DL channel obtained. Furthermore, 1012 may be performed by the BH channel measurement component 198.

In one aspect, the network node may configure the controller to implement a semi-static radar using analog hardware of the RIS/repeater (Type 5). The idea of the semi-static radar may be the network node requesting or configuring a specific node to store a RX waveform at a specific time, duration, resource allocation, and/or RX beam, and then the specific node to echo back the stored RX waveform at a specific time and duration to the network node. Here, the requesting or configuring of the semi-static radar may be implicitly provided based on the defined TCI state. That is, the TCI state may be configured or defined with the semi-static radar configuration, and the network node may configure or activate/deactivate the TCI state to request or configure the RIS/repeater to perform the semi-static radar function. The network node may derive or measure the channel from the echoed back waveform based on the RX waveform.

At 1020, the RIS/repeater may receive an instruction from the controller to transmit an echo signal of the Rx waveform, the instruction including a configuration for transmitting the echo signal. For example, at 920, the RIS/repeater 903 may receive an instruction from the controller 902 to transmit an echo signal of the Rx waveform, the instruction including a configuration for transmitting the echo signal. Furthermore, 1020 may be performed by the BH channel measurement component 198.

The controller may control the coupler regarding when and how to trigger the waveform recording. That is, based on the configuration of the RX beam and/or the time allocation of the resources, the controller may control the coupler to trigger or start recording the RX waveform received at the analog RX hardware, instruct the ADC to store the RX waveform to the buffer. The network node may also control the controller to control the switch regarding when and how to trigger the transmission of the recorded echo of the RX waveform. Based on the configuration of the TX beam and/or time allocation of the resources, the controller may control the switch to trigger or start transmitting the echo signal of the RX waveform stored in the buffer via the analog TX hardware to the PA.

The RIS/repeater may include an analog RX hardware configured to receive the signal (e.g., via the BH channel) from the network node, an analog TX hardware configured to transmit the received signal via a PA. To store the received RX waveform and echo back the received RX waveform, the RIS/repeater may include a buffer, an ADC to couple the RX waveform received at the analog RX hardware to the buffer, and a DAC configured to switch from the analog RX hardware to the DAC and transmit the reference signal stored in the buffer without configuring a processing power on the RIS/repeater.

At 1022, the RIS/repeater may an RX waveform from a network node. For example, at 922, the RIS/repeater 903 may an RX waveform from a network node 904. Furthermore, 1022 may be performed by the BH channel measurement component 198.

At 1024, the RIS/repeater may transmit the echo signal of the Rx waveform to the network node based on the configuration for transmitting the echo signal. That is, the RIS/repeater may store the RX waveform received at 922 to the buffer, and transmit the echo signal of the RX waveform stored in the buffer via the analog TX hardware to the PA, and the echo signal of the RX waveform may be transmitted to the network node. For example, at 924, the RIS/repeater 903 may transmit the echo signal of the Rx waveform to the network node 904 based on the configuration for transmitting the echo signal. Furthermore, 1024 may be performed by the BH channel measurement component 198.

At 1025, the RIS/repeater may receive the instruction of the to switch to transmit the reference signal using an analog transmitter on the UL channel (Type 3 or Type 4). For example, at 925, the RIS/repeater 903 may receive the instruction of the to switch to transmit the reference signal using an analog transmitter on the UL channel (Type 3 or Type 4). Furthermore, 1025 may be performed by the BH channel measurement component 198.

At 1026, the RIS/repeater may indicate the measurement of the reference signal of the at least one BH channel based on the signal. For example, at 926, the RIS/repeater 903 may indicate the measurement of the reference signal of the at least one BH channel based on the signal. Furthermore, 1026 may be performed by the BH channel measurement component 198. Here, 926 may include 928, 930, and 936.

At 1028, the RIS/repeater may transmit the reference signal on the UL channel to the controller. In one aspect, the network node may configure the controller to transmit the reference signal on the UL channel using the analog hardware of the RIS/repeater, and the network node may measure the reference signal received on the UL channel of the BH channel to measure the BH channel (Type 3). To make sure that the waveform of the reference signal transmitted to the network node may experience the exact channel that is experienced by the repeater, the RIS/repeater may include a buffer including the reference signal and a DAC to switch from the analog RX hardware to the DAC and transmit the reference signal stored in the buffer without configuring a processing power on the RIS/repeater, which may cause a network latency. The switching may be configured at the output of the analog RX hardware and the input of the analog RX hardware of the RIS/repeater. The switching may be configured for each analog TX ports of the analog TX hardware. For example, at 928, the RIS/repeater 903 may transmit the reference signal on the UL channel to the controller 902. Furthermore, 1028 may be performed by the BH channel measurement component 198.

FIG. 11 is a flowchart 1100 of a method of wireless communication. The method may be performed by a RIS/repeater (e.g., the RIS/repeater 113/903; the apparatus 1602). A network node may configure a controller and the RIS/repeater to measure one or more BH channels between the network node and the RIS/repeater or between multiple RIS/repeaters for multi-hop implementation. The network node may modify or optimize the configuration of the RIS/repeater based on the measurement of the one or more BH channels.

At 1107, the RIS/repeater may receive an instruction from a controller to indicate a measurement of a reference signal of at least one BH channel based on the signal. Instruction to indicate the measurement of the reference signal of the at least one BH channel may be based on the signal received. For example, at 907, the RIS/repeater 903 may receive an instruction from a controller 902 to indicate a measurement of a reference signal of at least one BH channel based on the signal. Furthermore, 1107 may be performed by a BH channel measurement component 198.

At 1126, the RIS/repeater may indicate the measurement of the reference signal of the at least one BH channel based on the signal. For example, at 926, the RIS/repeater 903 may indicate the measurement of the reference signal of the at least one BH channel based on the signal. Furthermore, 1126 may be performed by the BH channel measurement component 198.

Figure 12:
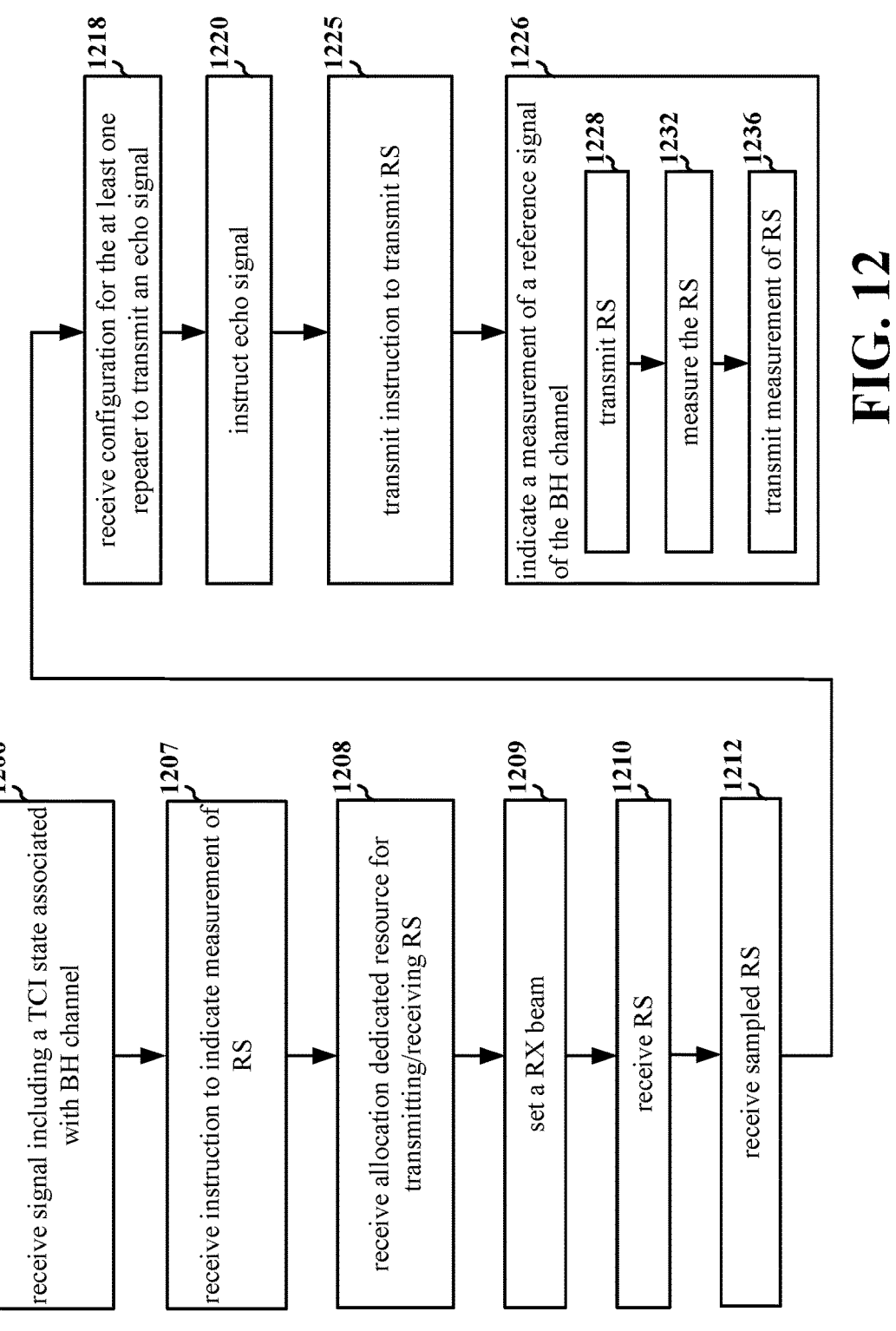
FIG. 12 is a flowchart of a method of wireless communication.

FIG. 12 is a flowchart 1200 of a method of wireless communication. The method may be performed by a controller (e.g., the controller 103A/902; the apparatus 1704). A network node may configure the controller and a RIS/repeater to measure one or more BH channels between the network node and the RIS/repeater or between multiple RIS/repeaters for multi-hop implementation. The network node may modify or optimize the configuration of the RIS/repeater based on the measurement of the one or more BH channels.

At 1206, the controller may receive a signal including a TCI state associated with at least one BH channel between a network node and the at least one repeater, the signal being obtained from the network node associated with the at least one repeater. In one aspect, the at least one BH channel may include a DL channel, and the TCI state associated with the at least one BH channel indicates for the controller associated with the at least one repeater to measure the reference signal on the DL channel. In another aspect, the at least one BH channel may include a UL channel, and the TCI state associated with the at least one BH channel indicates for the controller associated with the at least one repeater to measure the reference signal on the UL channel. For example, at 906, the controller 902 may receive a signal including a TCI state associated with at least one BH channel between a network node 904 and the at least one repeater, the signal being obtained from the network node 904 associated with the at least one repeater. Furthermore, 1206 may be performed by a BH channel measurement controlling component 198A.

In some aspects, the reference signal on the DL channel may be measured at an analog hardware of at least one of the RIS/repeater or the controller. In one aspect, the network node may transmit the reference signal on the DL channel and configure the controller to measure the DL channel using the analog hardware of the RIS/repeater (Type 1). In another aspect, the network node may transmit the reference signal on the DL channel and configure the controller to measure the DL channel using the analog hardware of the controller (Type 2). The network node may configure the RIS/repeater and/or the controller to transmit the reference signal on the UL channel, and the network node may measure the reference signal on the UL channel of the BH channel. In one aspect, the network node may configure the controller to transmit the reference signal on the UL channel using the analog hardware of the RIS/repeater, and the network node may measure the reference signal received on the UL channel of the BH channel to measure the BH channel (Type 3). In another aspect, the network node may configure the controller to transmit the reference signal on the UL channel using the analog hardware of the controller, and the network node may measure the reference signal received on the UL channel of the BH channel to measure the BH channel (Type 4). In another aspect, the network node may configure the controller to implement a semi-static radar using analog hardware of the RIS/repeater (Type 5).

The network node may signal to the controller which TCI the channel should be measured. That is, the network node may transmit, to the controller, a signaling including the TCI state associated with the BH channel between the network node and the RIS/repeater, and the network node may obtain the measurement of the reference signal of the BH channel based on the TCI state transmitted to the controller. In some aspects, the signaling including the TCI state may be transmitted via at least one of a MAC-CE or an RRC message. In one aspect, the network node may configure a set of TCI states for the controller using the RRC message, and activate/deactivate a TCI state from the set of TCI states using the MAC-CE. In another aspect, the network node may dynamically configure the TCI state for the controller using the MAC-CE.

At 1207, the controller may instruct the RIS/repeater to indicate a measurement of a reference signal of at least one BH channel based on the signal. Instruction to indicate the measurement of the reference signal of the at least one BH channel may be based on the signal received at 1206. For example, at 907, the controller 902 may instruct the RIS/ repeater 903 to indicate a measurement of a reference signal of at least one BH channel based on the signal. Furthermore, 1207 may be performed by the BH channel measurement controlling component 198A.

At 1208, the controller may receive an allocation of a dedicated resource on the DL channel for measuring the reference signal, or an allocation of a dedicated resource on the UL channel for transmitting the reference signal. For example, at 908, the controller 902 may receive an allocation of a dedicated resource on the DL channel for measuring the reference signal, or an allocation of a dedicated resource on the UL channel for transmitting the reference signal. Furthermore, 1208 may be performed by the BH channel measurement controlling component 198A.

In one aspect, the network node may allocate a dedicated resource for DL for the channel measurement. That is, the dedicated resource may refer to the reference signal transmitted by the network node to the at least one of the RIS/repeater or the controller, and the at least one of the RIS/repeater or the controller may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, TRS, PTRS, CSI-RS, etc. In another aspect, the network node may allocate a dedicated resource for UL for the channel measurement. That is, the dedicated resource may refer to the reference signal transmitted by the at least one of the RIS/repeater or the controller, and the network node may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, SRS, etc.

At 1209, the controller may set a RX beam to be associated with the TCI state, the DL channel including the reference signal being received on the Rx beam. For the DL channel of the BH channel, the controller may set the RX beam based on the TCI state signaled by the network node. In one aspect, the network node may configure the controller to measure the DL channel using the analog hardware of the RIS/repeater (Type 1), and the controller may set the RX beam of the RIS/repeater to receive the reference signal based on the TCI state signaled by the network node. In another aspect, the network node may configure the controller to measure the DL channel using the analog hardware of the controller (Type 2), and the controller may set the RX beam of the controller to receive the reference signal based on the TCI state signaled by the network node. For example, at 909, the controller 902 may set a RX beam to be associated with the TCI state, the DL channel including the reference signal being received on the Rx beam. Furthermore, 1209 may be performed by the BH channel measurement controlling component 198A.

At 1210, the controller may receive the reference signal in the dedicated resource in the DL channel associated with the TCI state of the signal. Here, the reference signal may be received and measured using the analog hardware of the controller. In one aspect, the network node may transmit the reference signal on the DL channel and configure the controller to measure the DL channel using the analog hardware of the controller (Type 2). The controller may use its own analog chain including the analog RX hardware of the controller to receive and measure the reference signal on the DL channel of the BH channel between the network node and the RIS/repeater. The controller and the RIS/repeater may have different location and/or different RX beam response, so the channel condition for the controller may be different from that for the RIS/repeater. However, measuring the BH channel using the analog hardware of the controller may provide a cost effective solution without providing dedicated components (e.g., the ADC 716 or the buffer 720 of FIG. 7A), with a trade-off of the channel condition difference between the controller and the RIS/repeater. For example, the controller may be physically located close to a RIS/repeater without the components for coupling, sampling, and/or storing the incoming signal. For example, at 910, the controller 902 may receive the reference signal in the dedicated resource in the DL channel associated with the TCI state of the signal. Furthermore, 1210 may be performed by the BH channel measurement controlling component 198A.

At 1212, the controller may obtain a sample of the DL channel including the reference signal from a buffer of the RIS/repeater to measure the reference signal based on the sample of the DL channel obtained. Here, the reference signal may be measured using the analog hardware of the at least one repeater. The controller may obtain a sample of the DL channel including the reference signal to a buffer of the repeater, and the reference signal is transmitted to the controller based on the sample of the DL channel obtained. For example, at 912, the controller 902 may obtain a sample of the DL channel including the reference signal from a buffer of the RIS/repeater 903 to measure the reference signal based on the sample of the DL channel obtained. Furthermore, 1212 may be performed by the BH channel measurement controlling component 198A.

In one aspect, the network node may configure the controller to implement a semi-static radar using analog hardware of the RIS/repeater (Type 5). The idea of the semi-static radar may be the network node requesting or configuring a specific node to store a RX waveform at a specific time, duration, resource allocation, and/or RX beam, and then the specific node to echo back the stored RX waveform at a specific time and duration to the network node. Here, the requesting or configuring of the semi-static radar may be implicitly provided based on the defined TCI state. That is, the TCI state may be configured or defined with the semi-static radar configuration, and the network node may configure or activate/deactivate the TCI state to request or configure the RIS/repeater to perform the semi-static radar function. The network node may derive or measure the channel from the echoed back waveform based on the RX waveform.

At 1218, the controller may receive a configuration for the at least one repeater to transmit an echo signal of a RX waveform. For example, at 918, the controller 902 may receive a configuration for the at least one repeater to transmit an echo signal of a RX waveform. Furthermore, 1218 may be performed by the BH channel measurement controlling component 198A.

At 1220, the controller may instruct the at least one repeater to transmit the echo signal of the Rx waveform to the network node based at least in part on the configuration to transmit the echo signal of the Rx waveform. For example, at 920, the controller 902 may instruct the at least one repeater to transmit the echo signal of the Rx waveform to the network node 904 based at least in part on the configuration to transmit the echo signal of the Rx waveform. Furthermore, 1220 may be performed by the BH channel measurement controlling component 198A.

At 1225, the controller may control the coupler regarding when and how to trigger the waveform recording. That is, based on the configuration of the RX beam and/or the time allocation of the resources, the controller may control the coupler to trigger or start recording the RX waveform received at the analog RX hardware, instruct the ADC to store the RX waveform to the buffer. The network node may also control the controller to control the switch regarding when and how to trigger the transmission of the recorded echo of the RX waveform. Based on the configuration of the TX beam and/or time allocation of the resources, the controller may control the switch to trigger or start transmitting the echo signal of the RX waveform stored in the buffer via the analog TX hardware to the PA. For example, at 925, the controller 902 may control the coupler regarding when and how to trigger the waveform recording. Furthermore, 1225 may be performed by the BH channel measurement controlling component 198A.

At 1226, the controller may indicate a measurement of a reference signal of the at least one BH channel based on the signal including the TCI state associated with the at least one BH channel. For example, at 926, the controller 902 may indicate a measurement of a reference signal of the at least one BH channel based on the signal including the TCI state associated with the at least one BH channel. Furthermore, 1226 may be performed by the BH channel measurement controlling component 198A. 1226 may include 1228, 1232, and 1236.

At 1228, the controller may transmit the reference signal on the UL channel of the at least one BH channel to the network node. Here, the UL channel may be transmitted using an analog hardware of the controller. In one aspect, the network node may configure the controller to transmit the reference signal on the UL channel using the analog hardware of the controller, and the network node may measure the reference signal received on the UL channel of the BH channel to measure the BH channel (Type 4). The controller may use its own analog chain including the analog TX hardware of the controller to transmit the reference signal on the UL channel of the BH channel between the network node and the RIS/repeater. The controller and the RIS/repeater may have different location and/or different TX beam response, so the channel condition for the controller may be different from that for the RIS/repeater. However, measuring the BH channel using the reference signal transmitted by the analog hardware of the controller may provide a cost effective solution without providing dedicated components (e.g., the DAC 718 or the buffer 720 of FIG. 7B), with a trade-off of the channel condition difference between the controller and the RIS/repeater. For example, the controller may be physically located close to a RIS/repeater without the components for switching to transmitting the reference signal. For example, at 928, the controller 902 may transmit the reference signal on the UL channel of the at least one BH channel to the network node 904. Furthermore, 1228 may be performed by the BH channel measurement controlling component 198A.

At 1232, the controller may measure the reference signal received on the DL channel. Here, the reference signal may be received at 1210 or the sampled reference signal may be received at 912. In one example, based on the network node configuring the controller to measure the DL channel using the analog hardware of the RIS/repeater (Type 1), the controller may measure the sampled RS received from the RIS/repeater at 1212. In another example, based on the network node configuring the controller to measure the DL channel using the analog hardware of the controller (Type 2), the controller may measure the RS received by the analog hardware of the controller at 1210. For example, at 932, the controller 902 may measure the reference signal received on the DL channel. Furthermore, 1232 may be performed by the BH channel measurement controlling component 198A.

At 1236, the controller may transmit the measurement of the reference signal received on the DL channel. Here, the measurement of the reference signal may be transmitted via at least one of a MAC-CE or an RRC message. The measurement of the reference signal may include a first vector of time units or a second vector of complex tap values. The measurement of the reference signal may be per layer and reception port, e.g., a measurement for each combination of layer and reception port. For example, at 936, the controller 902 may transmit the measurement of the reference signal received on the DL channel. Furthermore, 1236 may be performed by the BH channel measurement controlling component 198A.

FIG. 13 is a flowchart 1300 of a method of wireless communication. The method may be performed by a controller (e.g., the controller 103A/902; the apparatus 1704). A network node may configure the controller and a RIS/repeater to measure one or more BH channels between the network node and the RIS/repeater or between multiple RIS/repeaters for multi-hop implementation. The network node may modify or optimize the configuration of the RIS/repeater based on the measurement of the one or more BH channels.

At 1306, the controller may receive a signal including a TCI state associated with at least one BH channel between a network node and the at least one repeater, the signal being obtained from the network node associated with the at least one repeater. In one aspect, the at least one BH channel may include a DL channel, and the TCI state associated with the at least one BH channel indicates for the controller associated with the at least one repeater to measure the reference signal on the DL channel. In another aspect, the at least one BH channel may include a UL channel, and the TCI state associated with the at least one BH channel indicates for the controller associated with the at least one repeater to measure the reference signal on the UL channel. For example, at 906, the controller 902 may receive a signal including a TCI state associated with at least one BH channel between a network node 904 and the at least one repeater, the signal being obtained from the network node 904 associated with the at least one repeater. Furthermore, 1306 may be performed by a BH channel measurement controlling component 198A.

In some aspects, the reference signal on the DL channel may be measured at an analog hardware of at least one of the RIS/repeater or the controller. In one aspect, the network node may transmit the reference signal on the DL channel and configure the controller to measure the DL channel using the analog hardware of the RIS/repeater (Type 1). In another aspect, the network node may transmit the reference signal on the DL channel and configure the controller to measure the DL channel using the analog hardware of the controller (Type 2). The network node may configure the RIS/repeater and/or the controller to transmit the reference signal on the UL channel, and the network node may measure the reference signal on the UL channel of the BH channel. In one aspect, the network node may configure the controller to transmit the reference signal on the UL channel using the analog hardware of the RIS/repeater, and the network node may measure the reference signal received on the UL channel of the BH channel to measure the BH channel (Type 3). In another aspect, the network node may configure the controller to transmit the reference signal on the UL channel using the analog hardware of the controller, and the network node may measure the reference signal received on the UL channel of the BH channel to measure the BH channel (Type 4). In another aspect, the network node may configure the controller to implement a semi-static radar using analog hardware of the RIS/repeater (Type 5).

The network node may signal to the controller which TCI the channel should be measured. That is, the network node may transmit, to the controller, a signaling including the TCI state associated with the BH channel between the network node and the RIS/repeater, and the network node may obtain the measurement of the reference signal of the BH channel based on the TCI state transmitted to the controller. In some aspects, the signaling including the TCI state may be transmitted via at least one of a MAC-CE or an RRC message. In one aspect, the network node may configure a set of TCI states for the controller using the RRC message, and activate/deactivate a TCI state from the set of TCI states using the MAC-CE. In another aspect, the network node may dynamically configure the TCI state for the controller using the MAC-CE.

At 1326, the controller may indicate a measurement of a reference signal of the at least one BH channel based on the signal including the TCI state associated with the at least one BH channel. For example, at 926, the controller 902 may indicate a measurement of a reference signal of the at least one BH channel based on the signal including the TCI state associated with the at least one BH channel. Furthermore, 1326 may be performed by the BH channel measurement controlling component 198A.

Figure 14:
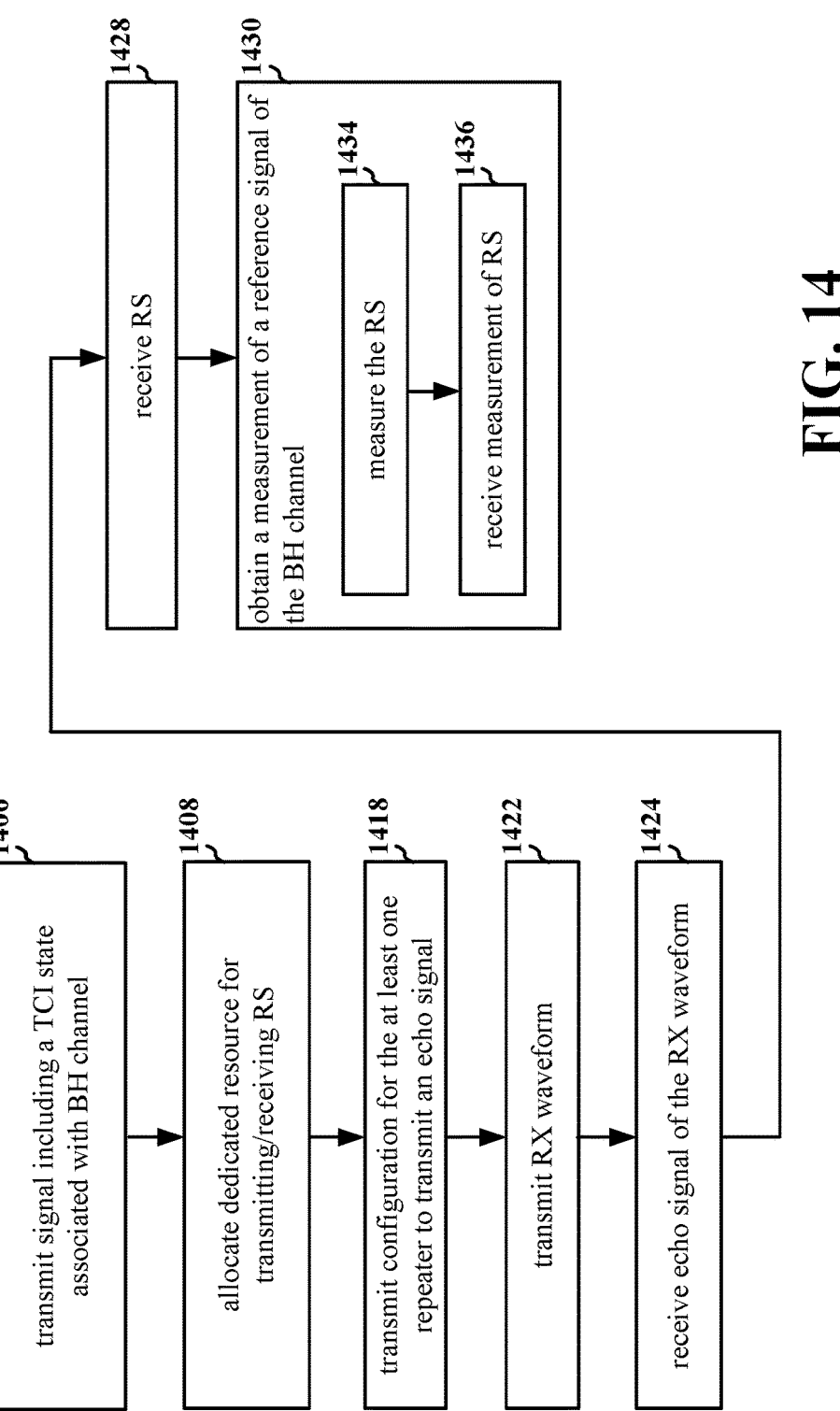
FIG. 14 is a flowchart of a method of wireless communication.

FIG. 14 is a flowchart 1400 of a method of wireless communication. The method may be performed by a network node (e.g., the base station 102; network node 904; the network entity 1802/1960). The network node may configure a controller and an RIS/repeater to measure one or more BH channels between the network node and the RIS/repeater or between multiple RIS/repeaters for multi-hop implementation. The network node may modify or optimize the configuration of the RIS/repeater based on the measurement of the one or more BH channels.

At 1406, the network node may transmit a signal including a TCI state associated with at least one BH channel between the network node and at least one repeater, the signal being transmitted for a controller associated with the at least one repeater. In one aspect, the at least one BH channel may include a DL channel, and the TCI state associated with the at least one BH channel indicates for the controller associated with the at least one repeater to measure the reference signal on the DL channel. In another aspect, the at least one BH channel may include a UL channel, and the TCI state associated with the at least one BH channel indicates for the controller associated with the at least one repeater to measure the reference signal on the UL channel. For example, at 906, the network node 904 may transmit a signal including a TCI state associated with at least one BH channel between the network node 904 and at least one repeater, the signal being transmitted for a controller 902 associated with the at least one repeater. Furthermore, 1406 may be performed by a BH channel measuring component 199.

In some aspects, the reference signal on the DL channel may be measured at an analog hardware of at least one of the RIS/repeater or the controller. In one aspect, the network node may transmit the reference signal on the DL channel and configure the controller to measure the DL channel using the analog hardware of the RIS/repeater (Type 1). In another aspect, the network node may transmit the reference signal on the DL channel and configure the controller to measure the DL channel using the analog hardware of the controller (Type 2). The network node may configure the RIS/repeater and/or the controller to transmit the reference signal on the UL channel, and the network node may measure the reference signal on the UL channel of the BH channel. In one aspect, the network node may configure the controller to transmit the reference signal on the UL channel using the analog hardware of the RIS/repeater, and the network node may measure the reference signal received on the UL channel of the BH channel to measure the BH channel (Type 3). In another aspect, the network node may configure the controller to transmit the reference signal on the UL channel using the analog hardware of the controller, and the network node may measure the reference signal received on the UL channel of the BH channel to measure the BH channel (Type 4). In another aspect, the network node may configure the controller to implement a semi-static radar using analog hardware of the RIS/repeater (Type 5).

The network node may signal to the controller which TCI the channel should be measured. That is, the network node may transmit, to the controller, a signaling including the TCI state associated with the BH channel between the network node and the RIS/repeater, and the network node may obtain the measurement of the reference signal of the BH channel based on the TCI state transmitted to the controller. In some aspects, the signaling including the TCI state may be transmitted via at least one of a MAC-CE or an RRC message. In one aspect, the network node may configure a set of TCI states for the controller using the RRC message, and activate/deactivate a TCI state from the set of TCI states using the MAC-CE. In another aspect, the network node may dynamically configure the TCI state for the controller using the MAC-CE.

At 1408, the network node may allocate a dedicated resource on the DL channel for transmitting the reference signal or a dedicated resource on the UL channel for receiving the reference signal. For example, at 908, the network node 904 may allocate a dedicated resource on the DL channel for transmitting the reference signal or a dedicated resource on the UL channel for receiving the reference signal. Furthermore, 1408 may be performed by the BH channel measuring component 199.

In one aspect, the network node may allocate a dedicated resource for DL for the channel measurement. That is, the dedicated resource may refer to the reference signal transmitted by the network node to the at least one of the RIS/repeater or the controller, and the at least one of the RIS/repeater or the controller may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, TRS, PTRS, CSI-RS, etc. In another aspect, the network node may allocate a dedicated resource for UL for the channel measurement. That is, the dedicated resource may refer to the reference signal transmitted by the at least one of the RIS/repeater or the controller, and the network node may measure the dedicated resource received on the BH channel to perform the BH channel measurement. In one example, the reference signal may include the dedicated resource configured with various parameters, e.g., pilot density, periodicity, etc. In another example, at least on parameter of the reference signal for measuring the BH channel may be referred from the parameters of another reference signal, e.g., DMRS, SRS, etc.

At 1418, the network node may transmit a configuration for the at least one repeater to transmit an echo signal of a RX waveform. For example, at 918, the network node 904 may transmit a configuration for the at least one repeater to transmit an echo signal of a RX waveform. Furthermore, 1418 may be performed by the BH channel measuring component 199.

At 1422, the network node may transmit an RX waveform to the RIS/repeater 903. For example, at 922, the network node 904 may transmit an RX waveform to the RIS/repeater 903. Furthermore, 1422 may be performed by the BH channel measuring component 199.

At 1424, the network node may receive the echo signal of the Rx waveform from the at least one repeater, the echo signal being based at least in part on the configuration for the at least one repeater to transmit the echo signal of the Rx waveform. That is, the RIS/repeater may store the RX waveform received at 1422 to the buffer, and transmit the echo signal of the RX waveform stored in the buffer via the analog TX hardware to the PA, and the echo signal of the RX waveform may be transmitted to the network node. For example, at 924, the network node 904 may receive the echo signal of the Rx waveform from the at least one repeater, the echo signal being based at least in part on the configuration for the at least one repeater to transmit the echo signal of the Rx waveform. Furthermore, 1424 may be performed by the BH channel measuring component 199.

At 1428, the network node may receive the reference signal on the UL channel of the at least one BH channel using an analog hardware of at least one of the at least one repeater or the controller. In one aspect, the network node may configure the controller to transmit the reference signal on the UL channel using the analog hardware of the RIS/repeater, and the network node may measure the reference signal received on the UL channel of the BH channel to measure the BH channel (Type 3). To make sure that the waveform of the reference signal transmitted to the network node may experience the exact channel that is experienced by the repeater, the RIS/repeater may include a buffer including the reference signal and a DAC to switch from the analog RX hardware to the DAC and transmit the reference signal stored in the buffer without configuring a processing power on the RIS/repeater, which may cause a network latency. The switching may be configured at the output of the analog RX hardware and the input of the analog RX hardware of the RIS/repeater. The switching may be configured for each analog TX ports of the analog TX hardware. For example, at 928, the network node 904 may receive the reference signal on the UL channel of the at least one BH channel using an analog hardware of at least one of the at least one repeater or the controller 902. Furthermore, 1428 may be performed by the BH channel measuring component 199.

At 1430, the network node may obtain a measurement of a reference signal of the at least one BH channel based on the signal including the TCI state associated with the at least one BH channel. For example, at 930, the network node 904 may obtain a measurement of a reference signal of the at least one BH channel based on the signal including the TCI state associated with the at least one BH channel. Furthermore, 1430 may be performed by the BH channel measuring component 199. Here, 930 may include 934 and 936.

At 1434, the network node may measure the reference signal received at 1428. The network node may measure the channel that may be equivalent to the BH channel. That is, the network node may measure the reference signal transmitted by at least one of the RIS/repeater (Type 3) or the controller (Type 4) on the UL channel of the BH channel, and measure the BH channel between the network node and the RIS/repeater. Based on Type 5, the network node may measure the echo signal of the RX waveform received at. The network node may measure and extract the BH channel from the received echo signal of the RX waveform. In one aspect, by adding a digital processing on the echo signal, e.g., a complex conjugate processing, the network node may perform a power delay profile (PDP) estimation for example, if h·s is received and (h·s)* is echoed back, the network node may get |h·s|$^2$, from which the PDP may be extracted. In comparison, if the echo signal is transmitted with the RS signal received as is, the network node may estimate a convolution of (h, h), from which the network node may extract the h after some processing. Accordingly, the network node and the RIS/repeater may perform a half-duplex radar operation where the network node may not need the full-duplex capability. For example, at 934, the network node 904 may measure the reference signal received at 928. Furthermore, 1434 may be performed by the BH channel measuring component 199.

At 1436, the network node may receive, from the controller associated with the at least one repeater, the measurement of the reference signal on the DL channel. Here, the measurement of the reference signal may be received via at least one of a MAC-CE or an RRC message. The measurement of the reference signal may include a first vector of time units or a second vector of complex tap values. The measurement of the reference signal may be per layer and reception port, e.g., a measurement for each combination of layer and reception port. For example, at 936, the network node 904 may receive, from the controller 902 associated with the at least one repeater, the measurement of the reference signal on the DL channel. Furthermore, 1436 may be performed by the BH channel measuring component 199.

In one aspect, the at least on repeater may include a first repeater and a second repeater, and to obtain the measurement of the at least one BH channel, the network node may be configured to obtain a first measurement of a first BH channel between the network node and the first repeater, obtain a second measurement of a second BH channel between the network node and the second repeater, and obtain a third measurement of a third BH channel between the first repeater and the second repeater based on the first measurement and the second measurement.

In some aspects, for a multi hop configuration, the network node may measure the channel between each hop and the network node. Then, if requested for a specific motivation, the network may extract the channel between each hop. That is, multiple hops of the RIS/repeater may be configured to transmit the signal from the network node to a target device (e.g., the target UE). For each hop, the network node may be configured to measure the BH channel between the network node and each RIS/repeater. That is, the network node may measure the BH channel between the network node and the last hop, and by combining the BH channel measurement between the network node and the last hop with a channel measurement between the target node and the network node (e.g., by using the SRS), the network node may extract the access channel between the last hop and target node (target UE for example)

The network node may combine any number of different types of measurements (e.g., Type 1, Type 2, Type 3, Type 4, or Type 5). The network node may use the one of the different types of measurements to measure the BH channel between each hop (e.g., RIS/repeat) and the network node, and the network node may measure the overall channel between the network node and the target node (e.g., the target UE). The network node may also use the SRS to measure the overall channel between the network node and the target UE. Based on the measurements between each hop and the network node and the overall channel measurement between the target node and the network node, the network node may extract any of the BH channel between each hop. In one example, the network node may be connected to the target node with N hops including (N−1) RIS/repeaters. The network node may measure a K$^{th}$ BH channel between the network node and a K$^{th}$ RIS/repeater and a (K−1)$^{th}$ BH channel between the network node and a (K−1)$^{th}$ RIS/repeater, and the network node may extract the BH channel between the (K−1)$^{th}$ RIS/repeater and the K$^{th}$ RIS/repeater based on the measurement of the K$^{th}$ BH channel and the measurement of the (K−1)$^{th}$ BH channel. Also, the network node may measure an (N−1)$^{th}$ BH channel between the network node and an (N−1)$^{th}$ RIS/repeater and an N$^{th}$ BH channel between the network node and the target node, and the network node may extract the BH channel between the (N−1)$^{th}$ RIS/repeater and the target node based on the measurement of the N$^{th}$ BH channel and the measurement of the (N−1)$^{th}$ BH channel.

FIG. 15 is a flowchart 1500 of a method of wireless communication. The method may be performed by a network node (e.g., the base station 102; network node 904; the network entity 1802/1960). The network node may configure a controller and an RIS/repeater to measure one or more BH channels between the network node and the RIS/repeater or between multiple RIS/repeaters for multi-hop implementation. The network node may modify or optimize the configuration of the RIS/repeater based on the measurement of the one or more BH channels.

At 1506, the network node may transmit a signal including a TCI state associated with at least one BH channel between the network node and at least one repeater, the signal being transmitted for a controller associated with the at least one repeater. In one aspect, the at least one BH channel may include a DL channel, and the TCI state associated with the at least one BH channel indicates for the controller associated with the at least one repeater to measure the reference signal on the DL channel. In another aspect, the at least one BH channel may include a UL channel, and the TCI state associated with the at least one BH channel indicates for the controller associated with the at least one repeater to measure the reference signal on the UL channel. For example, at 906, the network node 904 may transmit a signal including a TCI state associated with at least one BH channel between the network node 904 and at least one repeater, the signal being transmitted for a controller 902 associated with the at least one repeater. Furthermore, 1506 may be performed by a BH channel measuring component 199.

In some aspects, the reference signal on the DL channel may be measured at an analog hardware of at least one of the RIS/repeater or the controller. In one aspect, the network node may transmit the reference signal on the DL channel and configure the controller to measure the DL channel using the analog hardware of the RIS/repeater (Type 1). In another aspect, the network node may transmit the reference signal on the DL channel and configure the controller to measure the DL channel using the analog hardware of the controller (Type 2). The network node may configure the RIS/repeater and/or the controller to transmit the reference signal on the UL channel, and the network node may measure the reference signal on the UL channel of the BH channel. In one aspect, the network node may configure the controller to transmit the reference signal on the UL channel using the analog hardware of the RIS/repeater, and the network node may measure the reference signal received on the UL channel of the BH channel to measure the BH channel (Type 3). In another aspect, the network node may configure the controller to transmit the reference signal on the UL channel using the analog hardware of the controller, and the network node may measure the reference signal received on the UL channel of the BH channel to measure the BH channel (Type 4). In another aspect, the network node may configure the controller to implement a semi-static radar using analog hardware of the RIS/repeater (Type 5).

The network node may signal to the controller which TCI the channel should be measured. That is, the network node may transmit, to the controller, a signaling including the TCI state associated with the BH channel between the network node and the RIS/repeater, and the network node may obtain the measurement of the reference signal of the BH channel based on the TCI state transmitted to the controller. In some aspects, the signaling including the TCI state may be transmitted via at least one of a MAC-CE or an RRC message. In one aspect, the network node may configure a set of TCI states for the controller using the RRC message, and activate/deactivate a TCI state from the set of TCI states using the MAC-CE. In another aspect, the network node may dynamically configure the TCI state for the controller using the MAC-CE.

At 1530, the network node may obtain a measurement of a reference signal of the at least one BH channel based on the signal including the TCI state associated with the at least one BH channel. For example, at 930, the network node 904 may obtain a measurement of a reference signal of the at least one BH channel based on the signal including the TCI state associated with the at least one BH channel. Furthermore, 1530 may be performed by the BH channel measuring component 199. Here, 930 may include 934 and 936.

Figure 16:
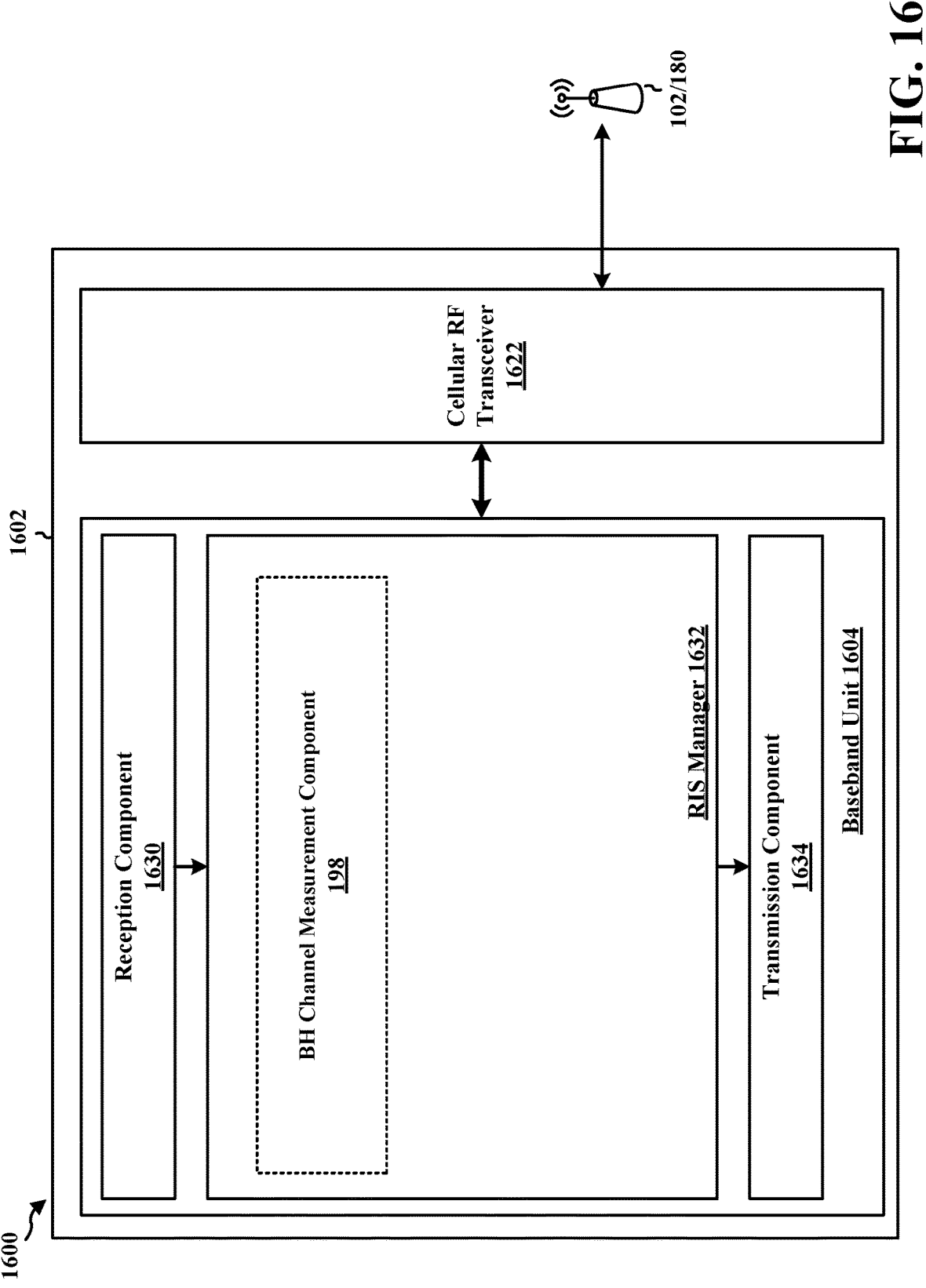
FIG. 16 is a diagram illustrating an example of a hardware implementation for an example apparatus and/or network entity.

FIG. 16 is a diagram 1600 illustrating an example of a hardware implementation for an apparatus 1602. The apparatus 1602 may be a RIS/repeater may implement RIS/repeater functionality. In some aspects, the apparatus 1602 may include a baseband unit 1604 (also referred to as a modem) coupled to one or more cellular RF transceiver 1622 (e.g., cellular RF transceiver). The baseband unit 1604 may include includes a reception component 1630, a RIS manager 1632, and a transmission component 1634. The RIS manager 1632 includes the one or more illustrated components. The components within the RIS manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

As discussed supra, the BH channel measurement controlling component 198A is configured to receive a signal including a TCI state associated with at least one BH channel between a network node and the at least one repeater, the signal being obtained from the network node associated with the at least one repeater, and indicate a measurement of a reference signal of the at least one BH channel based on the signal including the TCI state associated with the at least one BH channel. The BH channel measurement controlling component 198A may be within the baseband unit 1604. The BH channel measurement controlling component 198A may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1602 may include a variety of components configured for various functions. In one configuration, the apparatus 1602, and in particular the baseband unit 1604, includes means for receiving an instruction from a controller to indicate a measurement of a reference signal of at least one backhaul channel based on the signal, and means for indicating the measurement of the reference signal of the at least one backhaul channel based on the signal. In one configuration, the at least one backhaul channel includes a DL channel, and where the means for indicating the measurement of the at least one backhaul channel is configured to receive the reference signal on the DL channel, and transmit the reference signal received on the DL channel to the controller. In one configuration, the apparatus 1602, and in particular the baseband unit 1604, further includes means for receiving a configuration of a RX beam to be associated with a TCI state, the DL channel being received via the Rx beam. In one configuration, the apparatus 1602, and in particular the baseband unit 1604, further includes means for receiving an allocating of a dedicated resource for measuring the DL channel, where the reference signal is received on the dedicated resource of the DL channel. In one configuration, the apparatus 1602, and in particular the baseband unit 1604, further includes means for obtaining a sample of the DL channel including the reference signal to a buffer of the repeater, and the reference signal is transmitted to the controller based on the sample of the DL channel obtained. In one configuration, the at least one backhaul channel includes an UL channel, and where means for indicating the measurement of the at least one backhaul channel is further configured to transmit the UL channel of the at least one backhaul channel to a network node. In one configuration, the apparatus 1602, and in particular the baseband unit 1604, further includes means for allocating a dedicated resource for measuring the UL channel, and the measurement of the at least one backhaul channel is based on the dedicated resource for the UL channel. In one configuration, the apparatus 1602, and in particular the baseband unit 1604, further includes means for receiving a RX waveform from a network node, receiving an instruction from the controller to transmit an echo signal of the Rx waveform, the instruction including a configuration for transmitting the echo signal, and transmitting the echo signal of the Rx waveform to the network node based on the configuration for transmitting the echo signal. The means may be the BH channel measurement controlling component 198A of the apparatus 1602 configured to perform the functions recited by the means. As described supra, the apparatus 1602 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
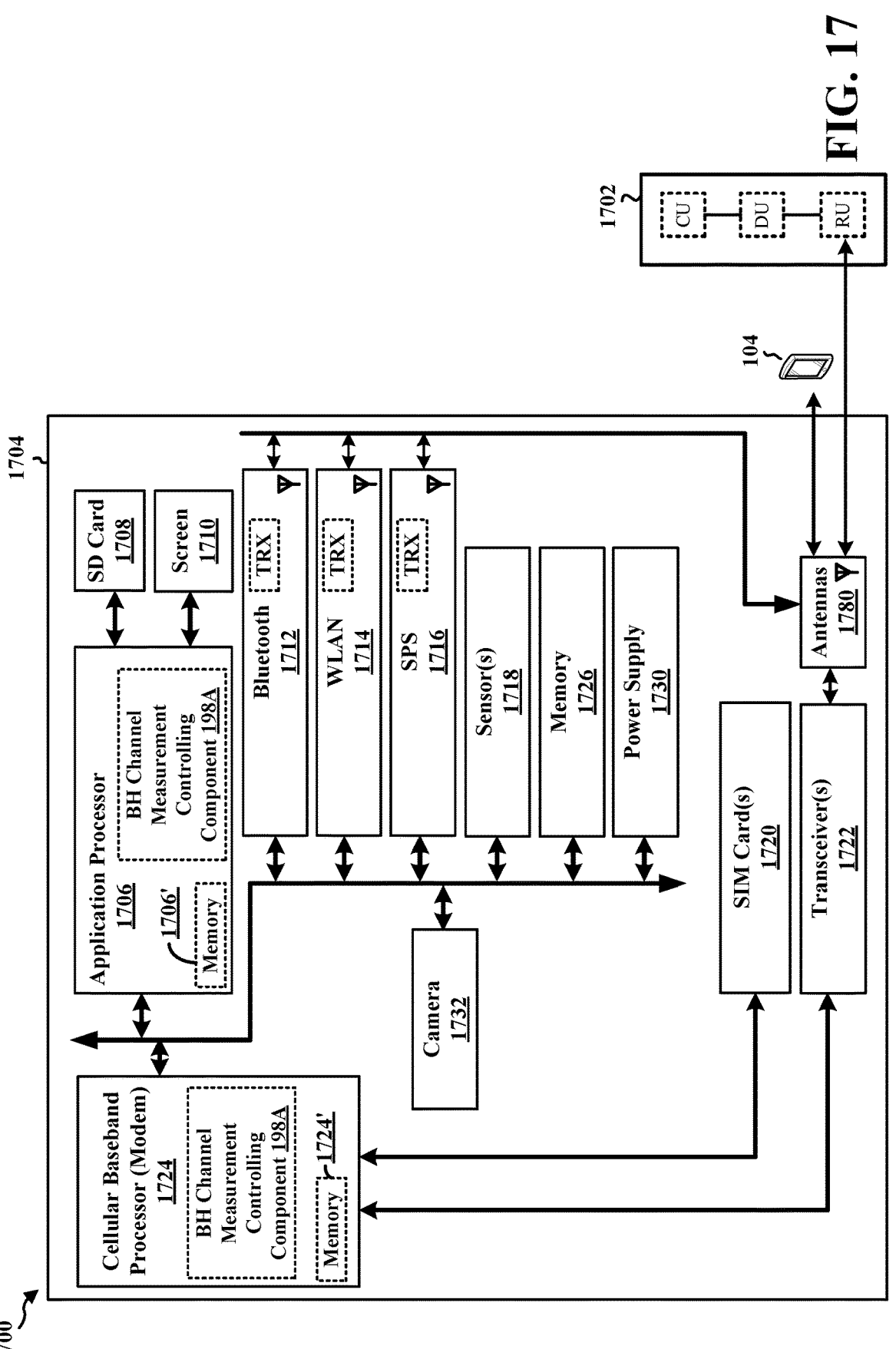
FIG. 17 is a diagram illustrating an example of a hardware implementation for an example network entity.

FIG. 17 is a diagram 1700 illustrating an example of a hardware implementation for an apparatus 1704. The apparatus 1704 may be a controller associated with at least one repeater, a component of a controller, or may implement controller functionality. In some aspects, the apparatus 1604 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the BH channel measurement component 198 is configured to receive an indication from a controller to indicate a measurement of a reference signal of at least one BH channel based on the signal, and indicate the measurement of the reference signal of the at least one BH channel based on the signal. The BH channel measurement component 198 may be within the cellular baseband processor 1724, the application processor 1706, or both the cellular baseband processor 1724 and the application processor 1706. The BH channel measurement component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving a signal including a TCI state associated with at least one backhaul channel between a network node and the at least one repeater, the signal being obtained from the network node associated with the at least one repeater, and means for indicating a measurement of a reference signal of the at least one backhaul channel based on the signal including the TCI state associated with the at least one backhaul channel. In one configuration, the at least one backhaul channel includes a DL channel, and the TCI state associated with the at least one backhaul channel indicates the controller to measure the reference signal on the DL channel using an analog hardware of at least one of the at least one repeater or the controller, and the means for indicating the measurement of the at least one backhaul channel configured to measure the reference signal received on the DL channel. In one configuration, the apparatus 1704, and in particular the cellular baseband processor 1724 and/or the application processor 1706, further includes means for setting a RX beam to be associated with the TCI state, the DL channel including the reference signal being received on the Rx beam. In one configuration, the apparatus 1704, and in particular the cellular baseband processor 1724 and/or the application processor 1706, further includes means for receiving an allocation of a dedicated resource on the DL channel for measuring the reference signal. In one configuration, the apparatus 1704, and in particular the cellular baseband processor 1724 and/or the application processor 1706, further includes means for receiving the reference signal in the dedicated resource in the DL channel associated with the TCI state of the signal. In one configuration, the reference signal is measured using the analog hardware of the at least one repeater, and the apparatus 1704, and in particular the cellular baseband processor 1724 and/or the application processor 1706, further including means for obtaining a sample of the DL channel including the reference signal from a buffer of the repeater to measure the reference signal based on the sample of the DL channel obtained. In one configuration, the reference signal is received and measured using the analog hardware of the controller. In one configuration, the at least one backhaul channel includes an UL channel, and indicating the measurement of the reference signal of the at least one backhaul channel further includes transmitting the reference signal on the UL channel of the at least one backhaul channel to the network node. In one configuration, the apparatus 1704, and in particular the cellular baseband processor 1724 and/or the application processor 1706, further includes means for receiving an allocation of a dedicated resource on the UL channel for transmitting the reference signal. In one configuration, the apparatus 1704, and in particular the cellular baseband processor 1724 and/or the application processor 1706, further includes means for instructing the at least one repeater to switch to transmitting the reference signal using an analog transmitter on the UL channel. In one configuration, the UL channel is transmitted using an analog hardware of the controller. In one configuration, the apparatus 1704, and in particular the cellular baseband processor 1724 and/or the application processor 1706, further includes means for receiving a configuration for the at least one repeater to transmit an echo signal of a RX waveform, and means for instructing the at least one repeater to transmit the echo signal of the Rx waveform to the network node based at least in part on the configuration to transmit the echo signal of the Rx waveform. The means may be the BH channel measurement component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
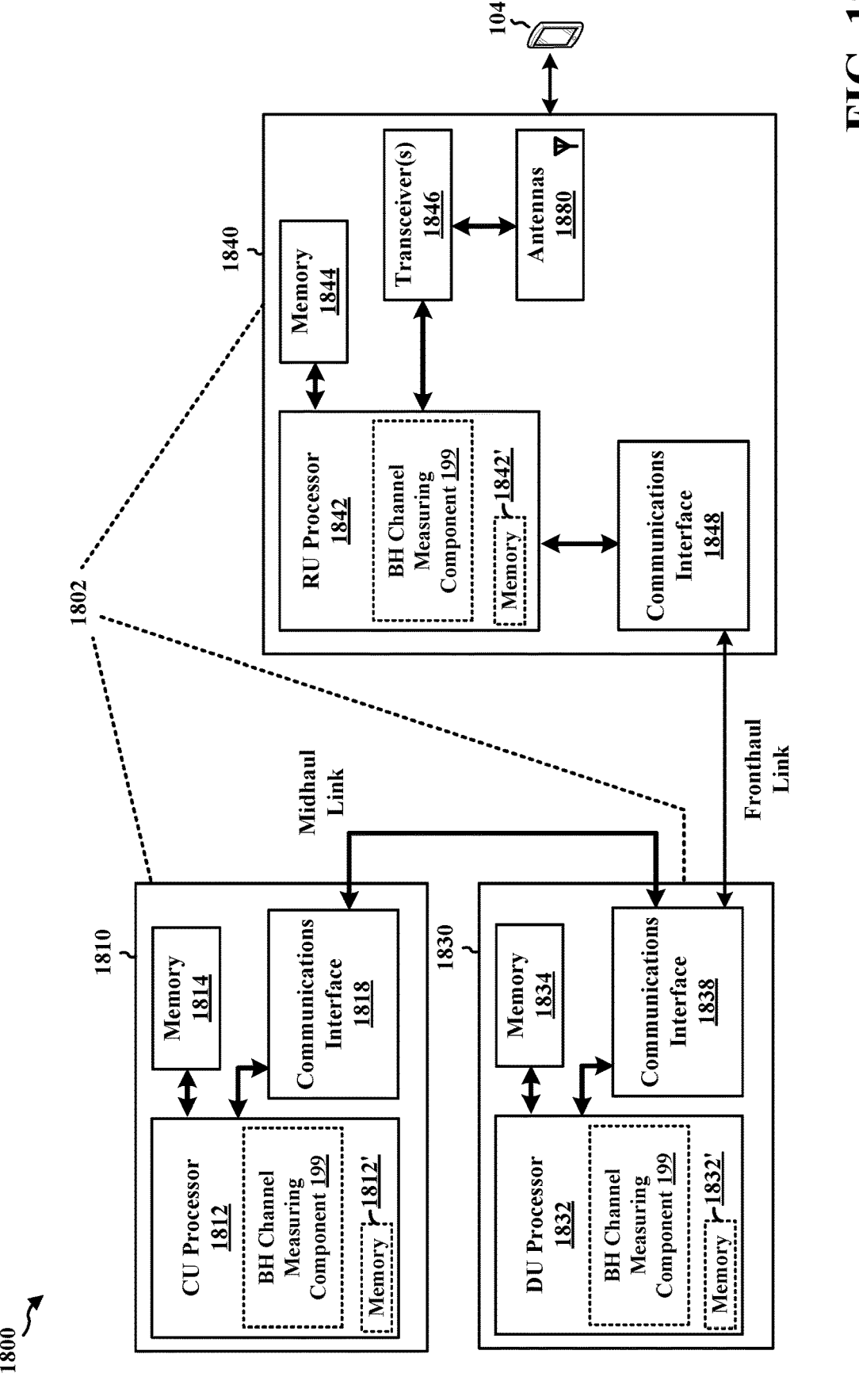
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the BH channel measuring component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the BH channel measuring component 199 is configured to transmit a signal including a TCI state associated with at least one BH channel between the network node and at least one repeater, the signal being transmitted for a controller associated with the at least one repeater, and obtain a measurement of a reference signal of the at least one BH channel based on the signal including the TCI state associated with the at least one BH channel. The BH channel measuring component 199 may be within one or more processors of one or more of the CU 1810, DU 1830, and the RU 1840. The BH channel measuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 includes means for transmitting a signal including a TCI state associated with at least one backhaul channel between the network node and at least one repeater, the signal being transmit for a controller associated with the at least one repeater, and means for obtaining a measurement of a reference signal of the at least one backhaul channel based on the signal including the TCI state associated with the at least one backhaul channel. In one configuration, the at least one backhaul channel includes a DL channel, and the TCI state associated with the at least one backhaul channel indicates for the controller associated with the at least one repeater to measure the reference signal on the DL channel. In one configuration, the network entity 1802 further includes means for allocating a dedicated resource on the DL channel for transmitting the reference signal. In one configuration, the network entity 1802 further includes means for transmitting the reference signal in the dedicated resource in the DL channel associated with the TCI state of the signal. In one configuration, the means for obtaining the measurement of the reference signal on the at least one backhaul channel is further configured to receive, from the controller associated with the at least one repeater, the measurement of the reference signal on the DL channel. In one configuration, the at least one backhaul channel includes an UL channel, and the network entity 1802 further including means for receiving the reference signal on the UL channel of the at least one backhaul channel using an analog hardware of at least one of the at least one repeater or the controller, and means for measuring the reference signal received by the network node. In one configuration, the network entity 1802 further includes means for allocating a dedicated resource on the UL channel for receiving the reference signal by the network node. In one configuration, the network entity 1802 further includes means for transmitting a configuration for the at least one repeater to transmit an echo signal of a RX waveform, transmitting the Rx waveform to the at least one repeater, and receiving the echo signal of the Rx waveform from the at least one repeater, the echo signal being based at least in part on the configuration for the at least one repeater to transmit the echo signal of the Rx waveform. In one configuration, the at least on repeater includes a first repeater and a second repeater, and the means for obtaining the measurement of the at least one backhaul channel is further configured to obtain a first measurement of a first backhaul channel between the network node and the first repeater, obtain a second measurement of a second backhaul channel between the network node and the second repeater, and obtain a third measurement of a third backhaul channel between the first repeater and the second repeater based on the first measurement and the second measurement. The means may be the BH channel measuring component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Figure 19:
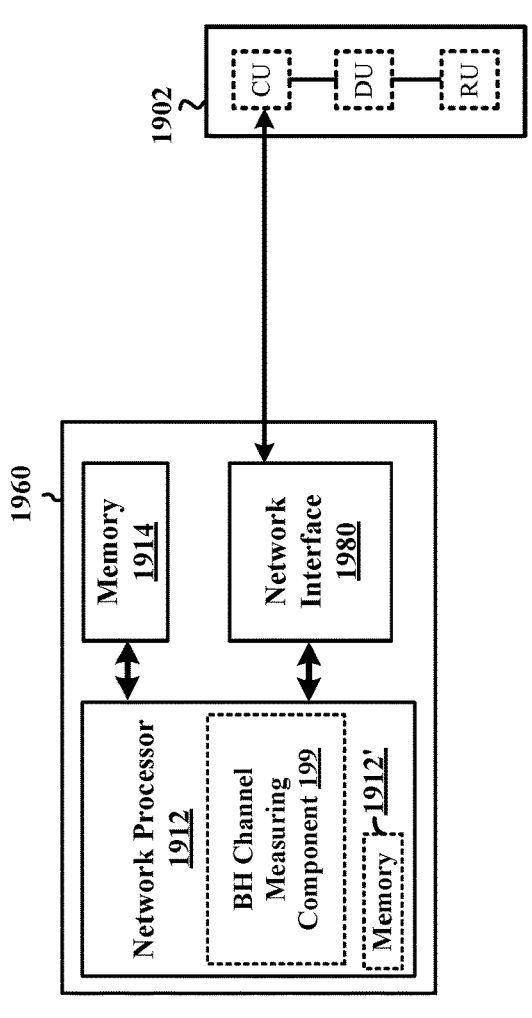
FIG. 19 is a diagram illustrating an example of a hardware implementation for an example network entity

FIG. 19 is a diagram 1900 illustrating an example of a hardware implementation for a network entity 1960. In one example, the network entity 1960 may be within the core network 120. The network entity 1960 may include a network processor 1912. The network processor 1912 may include on-chip memory 1912'. In some aspects, the network entity 1960 may further include additional memory modules 1914. The network entity 1960 communicates via the network interface 1980 directly (e.g., backhaul link) or indirectly (e.g., through a RIC) with the CU 1902. The on-chip memory 1912' and the additional memory modules 1914 may each be considered a computer-readable medium/ memory. Each computer-readable medium/memory may be non-transitory. The processor 1912 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the BH channel measuring component 199 is configured to transmit a signal including a TCI state associated with at least one BH channel between the network node and at least one repeater, the signal being transmitted for a controller associated with the at least one repeater, and obtain a measurement of a reference signal of the at least one BH channel based on the signal including the TCI state associated with the at least one BH channel. The BH channel measuring component 199 may be within the processor 1912. The BH channel measuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1960 may include a variety of components configured for various functions. In one configuration, the network entity 1960 includes means for transmitting a signal including a TCI state associated with at least one backhaul channel between the network node and at least one repeater, the signal being transmit for a controller associated with the at least one repeater, and means for obtaining a measurement of a reference signal of the at least one backhaul channel based on the signal including the TCI state associated with the at least one backhaul channel. In one configuration, the at least one backhaul channel includes a DL channel, and the TCI state associated with the at least one backhaul channel indicates for the controller associated with the at least one repeater to measure the reference signal on the DL channel. In one configuration, the network entity 1960 further includes means for allocating a dedicated resource on the DL channel for transmitting the reference signal. In one configuration, the network entity 1960 further includes means for transmitting the reference signal in the dedicated resource in the DL channel associated with the TCI state of the signal. In one configuration, the means for obtaining the measurement of the reference signal on the at least one backhaul channel is further configured to receive, from the controller associated with the at least one repeater, the measurement of the reference signal on the DL channel. In one configuration, the at least one backhaul channel includes an UL channel, and the network entity 1960 further including means for receiving the reference signal on the UL channel of the at least one backhaul channel using an analog hardware of at least one of the at least one repeater or the controller, and means for measuring the reference signal received by the network node. In one configuration, the network entity 1960 further includes means for allocating a dedicated resource on the UL channel for receiving the reference signal by the network node. In one configuration, the network entity 1960 further includes means for transmitting a configuration for the at least one repeater to transmit an echo signal of a RX waveform, transmitting the Rx waveform to the at least one repeater, and receiving the echo signal of the Rx waveform from the at least one repeater, the echo signal being based at least in part on the configuration for the at least one repeater to transmit the echo signal of the Rx waveform. In one configuration, the at least on repeater includes a first repeater and a second repeater, and the means for obtaining the measurement of the at least one backhaul channel is further configured to obtain a first measurement of a first backhaul channel between the network node and the first repeater, obtain a second measurement of a second backhaul channel between the network node and the second repeater, and obtain a third measurement of a third backhaul channel between the first repeater and the second repeater based on the first measurement and the second measurement. The means may be the BH channel measuring component 199 of the network entity 1960 configured to perform the functions recited by the means.

In some aspects of the disclosure, the apparatus may include a network node, a RIS/repeater, and a controller associated with the RIS/repeater. The network node may be configured to transmit a signal including a TCI state associated with at least one backhaul channel between the network node and at least one repeater, the signal being transmitted for a controller associated with the at least one repeater, and obtain a measurement of a reference signal of the at least one backhaul channel based on the signal including the TCI state associated with the at least one backhaul channel. The RIS/repeater may be configured to receive an indication from a controller to indicate a measurement of a reference signal of at least one backhaul channel based on the signal, and indicate the measurement of the reference signal of the at least one backhaul channel based on the signal. The controller of a RIS/repeater may be configured to receive a signal including a TCI state associated with at least one backhaul channel between a network node and the at least one repeater, the signal being obtained from the network node associated with the at least one repeater, and indicate a measurement of a reference signal of the at least one backhaul channel based on the signal including the TCI state associated with the at least one backhaul channel.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network node, including transmitting a signal including a TCI state associated with at least one backhaul channel between the network node and at least one repeater, the signal being transmit for a controller associated with the at least one repeater, and obtaining a measurement of a reference signal of the at least one backhaul channel based on the signal including the TCI state associated with the at least one backhaul channel.

Aspect 2 is the method of aspect 1, where the at least one backhaul channel includes a DL channel, and the TCI state associated with the at least one backhaul channel indicates for the controller associated with the at least one repeater to measure the reference signal on the DL channel.

Aspect 3 is the method of aspect 2, further including allocating a dedicated resource on the DL channel for transmitting the reference signal.

Aspect 4 is the method of aspect 3, further including transmitting the reference signal in the dedicated resource in the DL channel associated with the TCI state of the signal.

Aspect 5 is the method of any of aspects 2 to 4, where obtaining the measurement of the reference signal on the at least one backhaul channel further includes receiving, from the controller associated with the at least one repeater, the measurement of the reference signal on the DL channel, the measurement of the reference signal being based on at least one of a MAC-CE, an RRC message, a first vector of time units, a second vector of complex tap values, a measurement of the reference signal per layer and reception port, e.g., a measurement for each combination of layer and reception port.

Aspect 6 is the method of any of aspects 1 to 5, where the at least one backhaul channel includes an UL channel, and where the method further includes receiving the reference signal on the UL channel of the at least one backhaul channel using an analog hardware of at least one of the at least one repeater or the controller, and measuring the reference signal received by the network node.

Aspect 7 is the method of aspect 6, further including allocating a dedicated resource on the UL channel for receiving the reference signal by the network node.

Aspect 8 is the method of any of aspects 1 to 7, further including transmitting a configuration for the at least one repeater to transmit an echo signal of a RX waveform, transmitting the Rx waveform to the at least one repeater, and receiving the echo signal of the Rx waveform from the at least one repeater, the echo signal being based at least in part on the configuration for the at least one repeater to transmit the echo signal of the Rx waveform.

Aspect 9 is the method of any of aspects 1 to 8, where the at least on repeater includes a first repeater and a second repeater, and obtaining the measurement of the at least one backhaul channel includes obtaining a first measurement of a first backhaul channel between the network node and the first repeater, obtaining a second measurement of a second backhaul channel between the network node and the second repeater, and obtaining a third measurement of a third backhaul channel between the first repeater and the second repeater based on the first measurement and the second measurement.

Aspect 10 is an apparatus for wireless communication including at least one processor coupled to a memory and configured to implement any of aspects 1 to 9, further including a transceiver coupled to the at least one processor.

Aspect 11 is an apparatus for wireless communication including means for implementing any of aspects 1 to 9.

Aspect 12 is a non-transitory computer-readable medium storing computer executable code, where the code when executed by a processor causes the processor to implement any of aspects 1 to 9.

Aspect 13 is a method of wireless communication at a controller associated with at least one repeater, including receiving a signal including a TCI state associated with at least one backhaul channel between a network node and the at least one repeater, the signal being obtained from the network node associated with the at least one repeater, and indicating a measurement of a reference signal of the at least one backhaul channel based on the signal including the TCI state associated with the at least one backhaul channel.

Aspect 14 is the method of aspect 13, where the at least one backhaul channel includes a DL channel, and the TCI state associated with the at least one backhaul channel indicates the controller to measure the reference signal on the DL channel using an analog hardware of at least one of the at least one repeater or the controller, and where indicating the measurement of the at least one backhaul channel further includes measuring the reference signal received on the DL channel.

Aspect 15 is the method of aspect 14, further including setting a RX beam to be associated with the TCI state, the DL channel including the reference signal being received on the Rx beam.

Aspect 16 is the method of any of aspects 14 and 15, further including receiving an allocation of a dedicated resource on the DL channel for measuring the reference signal.

Aspect 17 is the method of aspect 16, further including receiving the reference signal in the dedicated resource in the DL channel associated with the TCI state of the signal.

Aspect 18 is the method of any of aspects 14 to 17, where the reference signal is measured using the analog hardware of the at least one repeater, and where the method further includes obtaining a sample of the DL channel including the reference signal from a buffer of the repeater to measure the reference signal based on the sample of the DL channel obtained.

Aspect 19 is the method of any of aspects 14 to 18, where the reference signal is received and measured using the analog hardware of the controller.

Aspect 20 is the method of any of aspects 13 to 19, where the at least one backhaul channel includes an UL channel, and indicating the measurement of the reference signal of the at least one backhaul channel further includes transmitting the reference signal on the UL channel of the at least one backhaul channel to the network node.

Aspect 21 is the method of aspect 20, further including receiving an allocation of a dedicated resource on the UL channel for transmitting the reference signal.

Aspect 22 is the method of any of aspects 20 and 21, further including instructing the at least one repeater to switch to transmitting the reference signal using an analog transmitter on the UL channel.

Aspect 23 is the method of any of aspects 20 to 22, where the UL channel is transmitted using an analog hardware of the controller.

Aspect 24 is the method of any of aspects 13 to 23, further including receiving a configuration for the at least one repeater to transmit an echo signal of a RX waveform, and instructing the at least one repeater to transmit the echo signal of the Rx waveform to the network node based at least in part on the configuration to transmit the echo signal of the Rx waveform.

Aspect 25 is an apparatus for wireless communication including at least one processor coupled to a memory and configured to implement any of aspects 13 to 24, further including a transceiver coupled to the at least one processor.

Aspect 26 is an apparatus for wireless communication including means for implementing any of aspects 13 to 24.

Aspect 27 is a non-transitory computer-readable medium storing computer executable code, where the code when executed by a processor causes the processor to implement any of aspects 13 to 24.

Aspect 28 is a method of wireless communication at a repeater, including receiving a first instruction from a controller to indicate a measurement of a reference signal of at least one backhaul channel based on the signal, and indicating the measurement of the reference signal of the at least one backhaul channel based on the signal.

Aspect 29 is the method of aspect 28, where the at least one backhaul channel includes a DL channel, and where indicating the measurement of the at least one backhaul channel further includes receiving the reference signal on the DL channel, and transmitting the reference signal received on the DL channel to the controller.

Aspect 30 is the method of aspect 29, further including receiving a configuration of a RX beam to be associated with a TCI state, the DL channel being received via the Rx beam.

Aspect 31 is the method of any of aspects 29 and 30, further including receiving an allocating of a dedicated resource for measuring the DL channel, where the reference signal is received on the dedicated resource of the DL channel.

Aspect 32 is the method of any of aspects 29 to 31, further including obtaining a sample of the DL channel including the reference signal to a buffer of the repeater, and the reference signal is transmitted to the controller based on the sample of the DL channel obtained.

Aspect 33 is the method of any of aspects 28 to 32, where the at least one backhaul channel includes an UL channel, and where indicating the measurement of the at least one backhaul channel further includes transmitting the UL channel of the at least one backhaul channel to a network node.

Aspect 34 is the method of aspect 33, further including allocating a dedicated resource for measuring the UL channel, and the measurement of the at least one backhaul channel is based on the dedicated resource for the UL channel.

Aspect 35 is the method of any of aspects 28 to 34, further including receiving a RX waveform from a network node, receiving a second instruction from the controller to transmit an echo signal of the Rx waveform, the instruction including a configuration for transmitting the echo signal, and transmitting the echo signal of the Rx waveform to the network node based on the configuration for transmitting the echo signal.

Aspect 36 is an apparatus for wireless communication including at least one processor coupled to a memory and configured to implement any of aspects 28 to 35, further including a transceiver coupled to the at least one processor.

Aspect 37 is an apparatus for wireless communication including means for implementing any of aspects 28 to 35.

Aspect 38 is a non-transitory computer-readable medium storing computer executable code, where the code when executed by a processor causes the processor to implement any of aspects 28 to 35.

What is claimed is:

1. An apparatus for wireless communication at a network node, comprising:

memory; and at least one processor coupled to the memory and configured to:

transmit an indication of a transmission configuration indicator (TCI) state to a controller that is separate from and coupled to at least one repeater having a reconfigurable intelligent surface (RIS), wherein the TCI state is indicated to the controller for measurement of a backhaul channel between the network node and the RIS of the at least one repeater; and obtain the measurement of a reference signal of the at least one backhaul channel based on the indication of the TCI state, wherein the measurement is obtained as one of:

measurement information received from the controller of a downlink reference signal measurement of a downlink reference signal transmitted from the network node based on the TCI state and measured based on reception at one of the controller or the RIS, the measurement measured at the network node of an uplink reference signal received at the network node from the controller or the RIS based on the TCI state, or the measurement measured at the network node of an echo signal from the RIS of a receive (Rx) waveform from the network node.

2. The apparatus of claim 1, further comprising a transceiver coupled to the at least one processor, wherein the at least one backhaul channel includes a downlink (DL) channel, and the TCI state associated with the at least one backhaul channel indicates for the controller associated with the at least one repeater to measure the reference signal on the DL channel.

3. The apparatus of claim 2, wherein the at least one processor is further configured to allocate a dedicated resource on the DL channel for transmitting the reference signal.

4. The apparatus of claim 3, wherein the at least one processor is further configured to transmit the reference signal in the dedicated resource in the DL channel associated with the TCI state of the reference signal.

5. The apparatus of claim 2, wherein, to obtain the measurement of the reference signal on the at least one backhaul channel, the at least one processor is configured to receive, from the controller associated with the at least one repeater, the measurement of the reference signal on the DL channel, the measurement of the reference signal being based on at least one of:

a medium access control-control element (MAC-CE), a radio resource control (RRC) message, a first vector of time units, a second vector of complex tap values, or the measurement of the reference signal for each combination of layer and reception port.

6. The apparatus of claim 1, wherein the at least one backhaul channel includes an uplink (UL) channel, and wherein the at least one processor is further configured to:

receive the reference signal on the UL channel of the at least one backhaul channel using an analog hardware of at least one of the at least one repeater or the controller; and measure the reference signal received by the network node.

7. The apparatus of claim 6, wherein the at least one processor is further configured to allocate a dedicated resource on the UL channel for receiving the reference signal by the network node.

8. The apparatus of claim 1, wherein the at least one processor is further configured to:

transmit a configuration for the at least one repeater to transmit the echo signal of the Rx waveform;

transmit the Rx waveform to the at least one repeater; and receive the echo signal of the Rx waveform from the at least one repeater, the echo signal being based at least in part on the configuration for the at least one repeater to transmit the echo signal of the Rx waveform.

9. The apparatus of claim 1, wherein the at least one repeater includes a first repeater and a second repeater, and to obtain the measurement of the at least one backhaul channel, the at least one processor is configured to:

obtain a first measurement of a first backhaul channel between the network node and the first repeater;

obtain a second measurement of a second backhaul channel between the network node and the second repeater; and obtain a third measurement of a third backhaul channel between the first repeater and the second repeater based on the first measurement and the second measurement.

10. An apparatus for wireless communication at a controller associated with at least one repeater, comprising:

memory; and at least one processor coupled to the memory and configured to:

receive, at the controller, an indication of a transmission configuration indicator (TCI) state associated with at least one backhaul channel between a network node and a reconfigurable intelligent surface (RIS) of the at least one repeater, wherein the controller is separate from and coupled to the at least one repeater, wherein the TCI state is indicated to the controller for measurement of the backhaul channel between the network node and the RIS of the at least one repeater; and indicate the measurement of a reference signal of the at least one backhaul channel based on the indication of the TCI state, wherein the measurement is indicated as one of:

measurement of the reference signal on a downlink (DL) channel using an analog hardware of at least one of the at least one repeater or the controller, transmission of an uplink (UL) reference signal of the controller or the at least one repeater, or an echo signal via the RIS of a receive (Rx) waveform from the network node.

11. The apparatus of claim 10, further comprising a transceiver coupled to the at least one processor, wherein the at least one backhaul channel includes the DL channel, and the TCI state associated with the at least one backhaul channel indicates the controller to measure the reference signal on the DL channel using the analog hardware of at least one of the at least one repeater or the controller, and wherein, to indicate the measurement of the at least one backhaul channel, the at least one processor is further configured to:

measure the reference signal received on the DL channel.

12. The apparatus of claim 11, wherein the at least one processor is further configured to set a receive (Rx) beam to be associated with the TCI state, the DL channel including the reference signal being received on the Rx beam.

13. The apparatus of claim 11, wherein the at least one processor is further configured receive an allocation of a dedicated resource on the DL channel for measuring the reference signal.

14. The apparatus of claim 13, wherein the at least one processor is further configured to receive the reference signal in the dedicated resource in the DL channel associated with the TCI state of the reference signal.

15. The apparatus of claim 11, wherein the reference signal is measured using the analog hardware of the at least one repeater, wherein the at least one processor is further configured to obtain a sample of the DL channel including the reference signal from a buffer of the at least one repeater to measure the reference signal based on the sample of the DL channel obtained.

16. The apparatus of claim 11, wherein the reference signal is received and measured using the analog hardware of the controller.

17. The apparatus of claim 10, wherein the at least one backhaul channel includes an UL channel, and wherein, to indicate the measurement of the reference signal of the at least one backhaul channel, the at least one processor is configured to:

transmit the reference signal on the UL channel of the at least one backhaul channel to the network node.

18. The apparatus of claim 17, wherein the at least one processor is further configured to receive an allocation of a dedicated resource on the UL channel for transmitting the reference signal.

19. The apparatus of claim 17, wherein the at least one processor is further configured to instruct the at least one repeater to switch to transmitting the reference signal using an analog transmitter on the UL channel.

20. The apparatus of claim 17, wherein the UL channel is transmitted using the analog hardware of the controller.

21. The apparatus of claim 10, wherein the at least one processor is further configured to:

receive a configuration for the at least one repeater to transmit the echo signal of the Rx waveform; and instruct the at least one repeater to transmit the echo signal of the Rx waveform to the network node based at least in part on the configuration to transmit the echo signal of the Rx waveform.

22. An apparatus for wireless communication at a repeater, comprising:

memory; and at least one processor coupled to the memory and configured to:

receive a first instruction from a controller, that is separate from and coupled to the repeater, to indicate a measurement of a reference signal of at least one backhaul channel between a reconfigurable intelligent surface (RIS) and a network node, wherein the measurement is based on the reference signal and an indicated transmission configuration indicator (TCI) state; and indicate the measurement of the reference signal of the at least one backhaul channel based on the indicated TCI state, wherein the measurement is indicated based on one of:

transmission, to the controller, of a downlink (DL) reference based on the indicated TCI state, transmission, to the network node, of an uplink (UL) reference signal based on the indicated TCI state, or transmission, to the network node, of an echo signal of a receive (Rx) waveform from the network node based on the indicated TCI state.

23. The apparatus of claim 22, further comprising a transceiver coupled to the at least one processor, wherein the at least one backhaul channel includes a DL channel, and wherein, to indicate the measurement of the at least one backhaul channel, the at least one processor is further configured to:

receive the reference signal on the DL channel; and transmit the reference signal received on the DL channel to the controller.

24. The apparatus of claim 23, wherein the at least one processor is further configured to receive a configuration of an Rx beam to be associated with a TCI state, the DL channel being received via the Rx beam.

25. The apparatus of claim 23, wherein the at least one processor is further configured receive an allocating of a dedicated resource for measuring the DL channel, and wherein the reference signal is received on the dedicated resource of the DL channel.

26. The apparatus of claim 23, wherein the at least one processor is further configured to obtain a sample of the DL channel including the reference signal to a buffer of the repeater, and wherein the reference signal is transmitted to the controller based on the sample of the DL channel obtained.

27. The apparatus of claim 22, wherein the at least one backhaul channel includes an UL channel, and wherein, to indicate the measurement of the at least one backhaul channel, the at least one processor is configured to:

transmit the UL channel of the at least one backhaul channel to the network node.

28. The apparatus of claim 27, wherein the at least one processor is further configured to allocate a dedicated resource for measuring the UL channel, and wherein the measurement of the at least one backhaul channel is based on the dedicated resource for the UL channel.

29. The apparatus of claim 22, wherein the at least one processor is further configured to:

receive the Rx waveform from the network node;

receive a second instruction from the controller to transmit the echo signal of the Rx waveform, the instruction including a configuration for transmitting the echo signal; and transmit the echo signal of the Rx waveform to the network node based on the configuration for transmitting the echo signal.

30. A method of wireless communication at a network node, comprising:

transmitting an indication of a transmission configuration indicator (TCI) state to a controller that is separate from and coupled to at least one repeater having a reconfigurable intelligent surface (RIS), wherein the TCI state is indicated to the controller for measurement of a backhaul channel between the network node and the RIS of the at least one repeater; and obtaining the measurement of a reference signal of the at least one backhaul channel based on the indication of the TCI state, wherein the measurement is obtained as one of:

measurement information received from the controller of a downlink reference signal measurement of a downlink reference signal transmitted from the network node based on the TCI state and measured based on reception at one of the controller or the RIS, the measurement measured at the network node of an uplink reference signal received at the network node from the controller or the RIS based on the TCI state, or the measurement measured at the network node of an echo signal from the RIS of a receive (Rx) waveform from the network node.

* * * * *